(12) United States Patent
Srinivasan

(10) Patent No.: US 11,748,909 B2
(45) Date of Patent: Sep. 5, 2023

(54) IMAGE-BASED DEPTH DATA AND LOCALIZATION

(71) Applicant: Zoox, Inc., Foster City, CA (US)

(72) Inventor: Praveen Srinivasan, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 236 days.

(21) Appl. No.: 17/397,006

(22) Filed: Aug. 9, 2021

(65) Prior Publication Data

US 2022/0012916 A1    Jan. 13, 2022

Related U.S. Application Data

(63) Continuation of application No. 16/408,407, filed on May 9, 2019, now Pat. No. 11,087,494.

(51) Int. Cl.
*G06T 7/80* (2017.01)
*G06T 7/50* (2017.01)
(Continued)

(52) U.S. Cl.
CPC ............ *G06T 7/80* (2017.01); *G01S 17/89* (2013.01); *G01S 17/931* (2020.01); *G06T 7/50* (2017.01);
(Continued)

(58) Field of Classification Search
CPC ......... G06T 7/50; G06T 7/80; G06K 9/00805; G06K 9/00825
See application file for complete search history.

(56) References Cited

U.S. PATENT DOCUMENTS 9,596,666 B1    3/2017 Sibenac et al.
9,616,896 B1    4/2017 Letwin et al.
(Continued)

FOREIGN PATENT DOCUMENTS

WO    WO2018063241 A1    4/2018
WO    WO2019023628 A1    1/2019
(Continued)

OTHER PUBLICATIONS

Non Final Office Action dated Aug. 6, 2020 for U.S. Appl. No. 16/408,414, "Image-Based Depth Data and Bounding Boxes", Srinivasan, 28 pages.
(Continued)

*Primary Examiner* — Sam Bhattacharya
(74) *Attorney, Agent, or Firm* — Lee & Hayes, P.C.

(57) ABSTRACT

A vehicle can use an image sensor to both detect objects and determine depth data associated with the environment the vehicle is traversing. The vehicle can capture image data and lidar data using the various sensors. The image data can be provided to a machine-learned model trained to output depth data of an environment. Such models may be trained, for example, by using lidar data and/or three-dimensional map data associated with a region in which training images and/or lidar data were captured as ground truth data. The autonomous vehicle can further process the depth data and generate additional data including localization data, three-dimensional bounding boxes, and relative depth data and use the depth data and/or the additional data to autonomously traverse the environment, provide calibration/validation for vehicle sensors, and the like.

20 Claims, 13 Drawing Sheets

(51) Int. Cl.
    *G01S 17/89*     (2020.01)
    *G01S 17/931*     (2020.01)
    *G06V 20/58*     (2022.01)

(52) U.S. Cl.
    CPC ............ *G06V 20/58* (2022.01); *G06V 20/584* (2022.01); *G06T 2207/20081* (2013.01); *G06T 2207/30261* (2013.01)

(56) References Cited

U.S. PATENT DOCUMENTS

| | | | |
|---|---|---|---|
| 10,169,678 | B1 | 1/2019 | Sachdeva et al. |
| 10,298,910 | B1 | 5/2019 | Kroeger |
| 10,460,180 | B2 | 10/2019 | Gao et al. |
| 10,486,485 | B1 | 11/2019 | Levinson et al. |
| 10,832,418 | B1 | 11/2020 | Karasev et al. |
| 2008/0091628 | A1 | 4/2008 | Srinivasa et al. |
| 2015/0199818 | A1 | 7/2015 | Einecke |
| 2017/0139417 | A1 | 5/2017 | Reiff et al. |
| 2017/0168494 | A1 | 6/2017 | Sibenac et al. |
| 2017/0192423 | A1 | 7/2017 | Rust et al. |
| 2017/0220876 | A1 | 8/2017 | Gao et al. |
| 2018/0046192 | A1 | 2/2018 | Keller et al. |
| 2018/0082435 | A1 | 3/2018 | Whelan et al. |
| 2018/0086336 | A1 | 3/2018 | Jones et al. |
| 2018/0260651 | A1 | 9/2018 | Wang et al. |
| 2018/0261095 | A1 | 9/2018 | Qiu et al. |
| 2019/0004533 | A1 | 1/2019 | Huang et al. |
| 2019/0004534 | A1 | 1/2019 | Huang et al. |
| 2019/0004535 | A1 | 1/2019 | Huang et al. |
| 2019/0011927 | A1 | 1/2019 | Mou |
| 2019/0039633 | A1 | 2/2019 | Li |
| 2019/0050000 | A1 | 2/2019 | Kennedy et al. |
| 2019/0056736 | A1 | 2/2019 | Wood et al. |
| 2019/0064825 | A1 | 2/2019 | Tschanz et al. |
| 2019/0096035 | A1 | 3/2019 | Li et al. |
| 2019/0107408 | A1 | 4/2019 | Stroman et al. |
| 2019/0118829 | A1 | 4/2019 | Goldberg et al. |
| 2019/0147245 | A1 | 5/2019 | Qi et al. |
| 2019/0147600 | A1 | 5/2019 | Karasev et al. |
| 2019/0171912 | A1 | 6/2019 | Vallespi-Gonzalez et al. |
| 2019/0228504 | A1 | 7/2019 | Tong et al. |
| 2019/0295315 | A1 | 9/2019 | Levinson et al. |
| 2019/0340775 | A1 | 11/2019 | Lee et al. |
| 2020/0005474 | A1 | 1/2020 | Ferrari et al. |
| 2020/0005489 | A1 | 1/2020 | Kroeger |
| 2020/0025935 | A1 | 1/2020 | Liang et al. |
| 2020/0072613 | A1 | 3/2020 | Kuzmanovic |
| 2020/0117199 | A1 | 4/2020 | Akella et al. |
| 2020/0167712 | A1 | 5/2020 | Stracquatanio et al. |
| 2020/0202542 | A1 | 6/2020 | Takhirov et al. |
| 2021/0089841 | A1* | 3/2021 | Mithun ............ G06F 18/24133 |

FOREIGN PATENT DOCUMENTS

| | | |
|---|---|---|
| WO | WO2019040800 A1 | 2/2019 |
| WO | WO2019099622 A1 | 5/2019 |

OTHER PUBLICATIONS

Non Final Office Action dated Sep. 11, 2020 for U.S. Appl. No. 16/408,417, "Image-Based Depth Data and Relative Depth Data", Srinivasan, 11 pages.

Office Action for U.S. Appl. No. 16/408,407, dated Feb. 19, 2021, Srinivasan, "Image-Based Depth Data and Localization", 7 pages.

Non Final Office Action dated Feb. 21, 2020 for U.S. Appl. No. 16/408,417 "Image-Based Depth Data and Relative Depth Data" Srinivasan, 14 pages.

* cited by examiner

IMAGE-BASED DEPTH DATA AND LOCALIZATION

RELATED APPLICATION

This is a continuation application which claims priority to commonly assigned, co-pending U.S. patent application Ser. No. 16/408,407, filed May 9, 2019. Application Ser. No. 16/408,407 is fully incorporated herein by reference.

BACKGROUND

A vehicle can use sensors to capture sensor data to detect objects in an environment. Accurate and precise sensor data can assist, for example, an autonomous vehicle, traverse the environment. In some instances, the sensors may have limited range and/or provide low density of data associated with the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
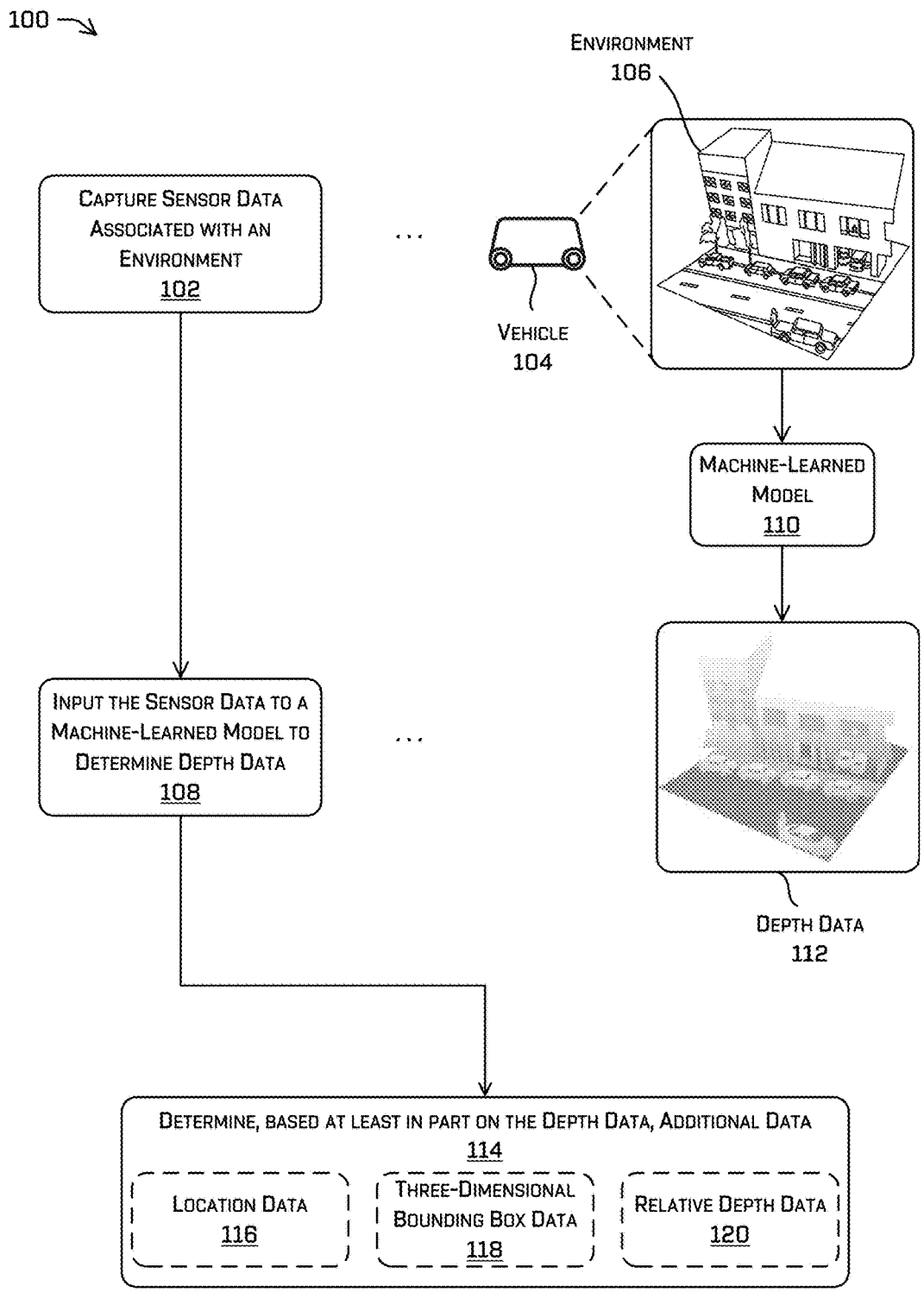
FIG. 1 is a pictorial flow diagram of an example process of a vehicle capturing sensor data, determining depth data, and determining additional data.

This disclosure describes systems, methods, and apparatuses for capturing sensor data and generating depth data and additional data associated with the sensor data. For example, a vehicle can use a sensor such as an image sensor to capture image data associated with an environment. To generate the depth data, the image data can be input into a machine-learned algorithm or model that has been trained with training image data and training depth data (e.g., lidar data) as ground truth data. The ground truth data can represent measured depth values associated with the training image data. The depth data generated by the machine-learned model can be used for subsequent processing including determining a location of the vehicle in an environment, determining a three-dimensional bounding box of object(s) in the environment, and/or determining relative and/or estimated depth data for object(s) (e.g., located relatively far from the vehicle) in the environment.

In some examples, a machine-learning model can be trained to determine depth data based on sensor data. The sensor data can include image sensor data and/or lidar data. For example, image data can be input into to a machine-learned model to determine depth data associated with the image data. In some instances, training image data and training lidar data can be input into to a machine-learning model to train the machine-learning model to generate the depth data associated with the image data.

The machine-learning model can be trained using training image data and training lidar data as a ground truth for training the machine-learning model. Examples of training machine-learning models can be found, for example, in U.S. patent application Ser. No. 15/803,682 titled "Dense Depth Estimation of Image Data" and filed Nov. 3, 2017. In some instances, the training image data can include data at a higher resolution or that represents a higher density of data as compared to the training lidar data. For purposes of illustration only, the training image data can include data from three channels (e.g., red, green, blue) each having millions of pixels, while the training lidar data corresponding to the training image data can include on the order of hundreds of thousands of points, or fewer. Therefore, based on the difference between the training image data and the amount of corresponding training lidar data, it can be understood that certain pixels of image data may not have a corresponding lidar measurement. In some instances, the operations discussed herein can provide depth data (i.e., monodepth data) corresponding to the image data, such that some or all of the individual pixels of the training image data can be associated with depth data.

In some instances, a machine-learning algorithm can be trained using additional channels of data including, for example, three channels that correspond to the RGB data, one channel that corresponds to a binary indication (e.g., a binary channel) that indicates whether lidar (or other depth data) is available for a particular pixel, and/or one channel can correspond to a depth measurement associated with the particular pixel. In some instances, the depth measurement can be considered a ground truth where the machine-learning model being trained can determine depth data to minimize a difference between the ground truth and the generated depth data. As can be understood, any number of channels and/or type(s) of data can be used for training a machine-learning model and as input to a deployed machine-learned algorithm. In some instances, the binary channel can be omitted.

After training, the machine-learned model can receive image data captured by image sensor(s) to determine depth data associated with image data. In some instances, the machine-learned model can receive captured depth data captured by depth sensors (e.g., lidar sensors). Examples of capturing depth data by sensors can be found, for example, in U.S. patent application Ser. No. 16/206,476 titled "Sensor Calibration Using Dense Depth Maps" and filed Nov. 30, 2018. The machine-learned model can use loss functions to minimize an error associated with the pixel(s) associated with the captured depth data. For example, the error can include a difference between the depth value output based on the image data and a ground truth depth value associated with the captured depth data. For purposes of illustration only, the machine-learned model can use a Least Absolute Deviations algorithm (e.g., an L1 loss function) and/or a Least Square Errors e.g., an L2 loss function) to compute a loss and/or minimize an error of the depth data. In some instances, the machine-learned model can determine a softmax loss (i.e., a cross-entropy loss) to determine a probability associated with the depth data.

In some instances, the depth data can be stored for subsequent processing. For example, some applications or systems of an autonomous vehicle can use the depth data for localization, perception (e.g., detecting, identifying, segmenting, classifying, tracking, etc. objects in the environment), relative depth data generation, etc. As can be understood, these applications are examples, and such examples and uses of depth data or measured depth data is not intended to be limiting.

In some instances, an output of the machine-learned model can represent a discrete output or can represent a continuous output value. For example, the machine-learned model can determine discrete depth portions/bins associated with the image data. For example, output values falling within a range of depths (e.g., within a depth bin) can be associated with a discrete depth bin and output a discrete value. By way of example and without limitation, a depth value falling within a depth bin ranging from 10 meters to 11 meters could be associated with a 10.5-meter discrete depth bin with a binned output of 10.5 meters. In some instances, the depth bins can be determined on a non-linear scale. For purposes of illustration only, the depth bins can be determined on a logarithmic scale where a first depth bin can include a range of 0 meters to 0.9, a second depth bin can include a range of 1 meter to 9.9 meters, a third depth bin can include a range of 10 meters to 99.9 meters etc. In some instances, the non-linear scale can include an inverse scale (e.g., linear in inverse depth, $1\ m^{-1}$, $2\ m^{-1}$, etc., which would correspond to 1 m, 0.5 m, 0.33 m, etc.), although other linear and non-linear scales are contemplated. In some examples, a continuous offset can be determined with respect to a binned output. Continuing with the example above, a machine-learned model may output a binned depth value of 10.5 meters with a continuous offset of positive 15 cm from the discrete depth value. In such an example, the depth value would correspond to a depth of 10.65 meters. In some examples, a machine-learned model can output a continuous depth value as a continuous output (e.g., the machine-learned model can output a depth value of 10.65 meters without performing such binning operations). Therefore, the continuous offset can provide a graduated transition of between depth values regardless of whether the discrete depth bins are used. In some instances, the machine-learned algorithm can use a loss function and/or softmax loss that is associated with a depth bin to determine the continuous offset.

The depth data generation techniques described herein can improve a functioning of a computing device by providing additional depth data for performing subsequent operations to control an autonomous vehicle. For example, depth data associated with image data can allow subsequent processes such as localization, perception (e.g., detecting, identifying, segmenting, classifying, tracking, etc.), route planning, trajectory generation, and the like to be performed more accurately, may require less processing power, and/or may require less memory. For example, in some instances, faster and/or more accurate segmentation can be used in generating a trajectory of an autonomous vehicle, which can improve safety for occupants of an autonomous vehicle. Further, in some examples, the techniques discussed herein can be used to verify a calibration of sensors, can provide error checking or voting to determine if a sensor measurement is inaccurate (e.g., by comparing a depth measurement to another depth sensor), and/or can be used as a fallback in the event other sensors are occluded or disabled. These and other improvements to the functioning of the computer are discussed herein.

As discussed above, a vehicle can use the depth data generated by the machine-learned model to perform operations including determining a location of a vehicle in an environment. For example, a vehicle can access a global map of an environment and perform localization operations including comparing depth data and the global map to determine a location of the vehicle. In some instances, the global map data can be lidar-based map data. In some instances, the global map data can include a three-dimensional mesh map data and/or voxel-based map data.

During localization operations, a vehicle can use depth data generated by the machine-learned model as a point cloud of data (e.g., the local map or depth data) and can perform any number of operations to use such data to localize the vehicle to a map. In some instances, localization operations can be performed using a CLAMS (calibration, localization, and mapping, simultaneously) algorithm or a SLAM (simultaneous localization and mapping) algorithm, although other algorithms (e.g., iterative closest point) are contemplated. In some instances, the vehicle can use multiple portions of the point cloud and project and/or align the multiple portions of the point cloud onto multiple portions of the three-dimensional global map to determine the location.

In some examples, the techniques discussed herein can determine a location of a vehicle using depth data determined from image data with respect to a same map data by which a location can be determined using depth data determined from lidar data. Thus, in some cases, an image-based localization can be used to verify an accuracy of a lidar-based localization using a same map, which can provide flexibility and redundancy in determining a vehicle location.

In some instances, image-based segmentation techniques can be used remove dynamic objects to improve localization operations. For examples, image based segmentation techniques can be used to identify and remove/discard data associated with dynamic objects represented in image data, whereby the remaining data can represent static objects in an environment. For example, depth data associated with dynamic objects (e.g., vehicles, pedestrians, cyclists, animals, debris, etc.) can be excluded from the depth data and result in a point cloud that is associated with static objects (e.g., buildings, signage, lamp posts, traffic signals, landmarks, etc.). The point cloud that includes the static objects can assist the vehicle in determining a location of the vehicle. In some instances, the localization operation can use perception operations to classify and/or detect the static objects and/or the dynamic objects associated with the image data. In some such examples, segmentation and masking may be performed before extracting a depth from vision. In other examples, such segmentation and depth determination may be performed in a single network (or machine-learned model).

In some instances, the machine-learned model can be trained to determine a surface normal associated with static objects. For example, a surface normal can indicate a vector that is perpendicular to the tangent plane of the surface (e.g., a building, a road surface, etc.). For purposes of illustration only, the vehicle can capture image data that represents a building at a distance where the depth data generated by the machine-learned model includes a confidence level associated with the depth data. In some instances, the machine-learned model can generate surface normal data associated with the building where the confidence level associated with the surface normal data exceeds the confidence level associated with the depth data. The localization operations can the surface normal data to determine a location and/or an orientation (e.g., a pose) of the vehicle. The machine-learned model can be trained to determine the surface normal data using, for example, captured depth data (e.g., lidar data, point cloud data) to provide supervision for the machine-learning model.

As introduced above, a vehicle can use the depth data generated by the machine-learned model to perform operations including perception operations to, for example, detect, identify, segment, classify, and/or track objects, among other operations, of an environment. In some instances, the depth data can be used to generate a three-dimensional bounding box (or, otherwise, a mask) associated with an object.

The vehicle can use sensors, such as image sensors, to capture image data of an environment. The image data can represent an object in the environment. Various algorithms (such as Single Shot Detector Multibox, Fast-CNN, Faster-R CNN, overfeat, region based fully-connected networks, etc.) can be applied to identify the object represented in the image, and generate a two-dimensional bounding box associated with the object. These algorithms can be selected to only identify certain object classes. For example, the algorithm may detect only cars, pedestrians, animals, or any combination thereof, though detection of any number of object classes is contemplated. A two-dimensional bounding box, however, may not provide sufficient information for certain applications such as autonomous vehicles and may require three-dimensional bounding boxes.

A three-dimensional bounding box often represents a minimum volume cuboid which encompasses an object. The three-dimensional bounding box provides information about spatial location, orientation, pose, and/or size (e.g., length, width, height, etc.) for the object it contains. This information provided to, for example, an autonomous system can be used for tracking, navigation, and collision avoidance.

Accordingly, the three-dimensional bounding box representing the object in the environment can be provided to a prediction system or a planner system of the autonomous vehicle to generate a trajectory for the autonomous vehicle to navigate the environment. For example, the prediction system and/or planner system can generate a trajectory for the autonomous vehicle so that the autonomous vehicle does not collide with the object represented by the three-dimensional bounding box. In some instances, a perception system can generate a second three-dimensional bounding box and a computing system of the vehicle can determine a difference between the depth data-based three-dimensional bounding box and the perception-based three-dimensional bounding box. The difference, if it exceeds a threshold difference (e.g., differences in extents, centers, corner locations, confidence levels, and the like), can indicate a calibration error associated with an image sensor and/or a lidar sensor. In some instances, a planner system of the autonomous vehicle can determine a trajectory for the autonomous vehicle based on the depth data-based three-dimensional bounding box and the perception-based three-dimensional bounding box.

A machine-learned model can be trained to use the image data, the two-dimensional bounding box associated with the object, and/or the image-based depth data to output a three-dimensional bounding box and the depth data associated with the object. In some instances, the machine-learned model can include a confidence level associated with the three-dimensional bounding box.

In some examples, a machine-learning model can be trained to output a three-dimensional bounding box associated with an object using ground truth data received from a perception system of an autonomous vehicle. For example, a perception system can use image data, radar data, lidar data, and the like to determine perception data including a three-dimensional bounding box of an object in an environment. Such a three-dimensional bounding box can be considered as ground truth data when training a machine-learning model to output a three-dimensional bounding box (and, in some examples, depth data) based on image data. In some instances, the machine-learned model can be trained using two-dimensional/three-dimensional bounding box pairs that are associated with the object where the three-dimensional bounding box is determined by the perception system. In some examples, such a machine-learned model can output a three-dimensional bounding box and depth data based solely on image data (e.g., without other depth data such as lidar data or radar data).

In some instances, the two-dimensional bounding box can be associated with attributes of the object. For purposes of illustration only, the object can be a vehicle and the attributes can indicate that the vehicle has its front wheels turned, has its turn indicator turned on, has a door opened, etc. The two-dimensional bounding box can be associated with the three-dimensional bounding box and the three-dimensional bounding box can be associated with the attributes of the object. In some instances, the object can be a pedestrian and the attributes can indicate that the pedestrian is walking, is about to cross a street, etc. As can be understood, additional types of objects can be associated with a variety of attributes. In such examples, three dimensional parameters may be associated with the two-dimensional object (e.g., a velocity, acceleration, etc. which would otherwise not be able to be computed in two dimensions).

The three-dimensional bounding box determination techniques described herein can improve a functioning of a computing device by providing a robust mechanism for determining object data in an environment using image data. For example, in some instances, the techniques used herein can provide robust object data outside the range of traditional sensors such as lidar or radar as image data can provide, in some instances, more dense data than comparable lidar data and/or radar data. Further, the techniques can be robust with respect to occlusions of the image data, such that partially occluded representations of objects can be used to determine object orientations, motion, extents, and the like. Further, the three-dimensional bounding boxes of objects in an environment can allow various systems of an autonomous vehicle performing segmentation, classification, route planning, trajectory generation, and the like to be performed more accurately, may require less processing power, and/or may require less memory. For example, more accurate and/or redundant object information may be utilized in generating a trajectory of an autonomous vehicle, which may improve safety for occupants of an autonomous vehicle. These and other improvements to the functioning of the computer are discussed herein.

As discussed above, a vehicle can use the depth data generated by the machine-learned model to perform operations including generating relative depth data (e.g., augmenting depth data from another sensor modality). For example, a vehicle can use sensors such as image sensors to capture image data of an environment. As the vehicle traverses the environment, it can detect an object represented in the image data. In some instances, the object can be located in a region of the environment that is associated with sparse depth data. For purposes of illustration only, the object can be in a region that is 50 meters ahead of the vehicle where lidar data is unavailable or is associated with a low density of lidar data (e.g., sparse depth data). The vehicle can use the machine-learned model to determine relative depth data associated with the image data and/or the object. The vehicle can use a threshold to determine whether the object is in a sparse depth data region. For purposes of illustration only, the object can be associated with a portion of the image data that has comprises 1,048,576 pixels (i.e., 1,024 pixels by 1,024 pixels). The portion of the image data can be associated with 5 lidar return points resulting in a captured depth data density of 5 per 1,024 square pixels. The vehicle can determine that the captured data density does not meet or exceed a captured data density threshold and determine that the object occupies a spase depth data region.

For purposes of illustration only, the relative depth data can include a first relative depth associated with a first portion of an object and a second relative depth associated with a second portion of the object. In some examples, the machine-learned model can be trained to output such relative depths based on captured image data and ground truth lidar data corresponding to at least a portion of the captured image data. In some examples, when an estimated depth output by the machine-learned model does not meet or exceed a threshold value (e.g., because a distance between an object and the image sensor is relatively far) the machine-learned model can output relative depths associated with portions of an object. In some instances, the relative depth data can include a relative depth, a relative boundary, a relative orientation, and/or a relative pose associated with the object. In some examples, the estimated depth data can be used in part, to generate and/or define a two-dimensional and/or a three-dimensional bounding box associated with the object.

Additionally, the vehicle can use sensors such as lidar sensors to captured additional depth data of an environment. The captured lidar data can be associated with relative depth values as determined based on image data, which can "anchor" the relative depth data to provide an estimated depth data (or absolute depth data) of the object. That is, based on the captured lidar data and the relative depth data, the vehicle can determine estimated depth data associated with the object that can include a first estimated depth (associated with the first relative depth), a second estimated depth (associated with the second relative depth), and an estimated length (associated with the relative length). In some instances, the estimated depth data can include an estimated depth, an estimated boundary, an estimated orientation, and/or an estimated pose associated with the object.

A machine-learning model can be trained to generate relative depth data using training image data and training lidar data as a ground truth for training. For example, a portion of the training image data can be associated with a portion of the training lidar data. In some instances, the training image data can include an image crop that is associated with an object. For purposes of illustration only, segmentation operations (e.g., semantic segmentation, instance segmentation, etc.) can be performed on the training image data to isolate portions of the training image data that is associated with an object to generate the image crop. The machine-learning model can use the training lidar data associate with the training image data and/or the image crops as supervision to train the machine-learning model.

The relative depth data generation techniques described herein can improve a functioning of a computing device by providing additional relative depth data for performing subsequent operations to control an autonomous vehicle. For example, relative depth data associated with image data can allow subsequent processes such as localization, perception (e.g., detecting, identifying, segmenting, classifying, tracking, etc.), route planning, trajectory generation, and the like to be performed more accurately, may require less processing power, and/or may require less memory. For example, in some instances, using relative depth data can result in faster and/or more accurate planning of an autonomous vehicle. The autonomous vehicle can determine, prior to identifying estimated depth data associated with an object, the relative depth data which can indicate a relative height, width, etc. in addition to a relative distance between objects in the environment. As the autonomous vehicle captures additional depth data associated with an object, the autonomous vehicle can extrapolate and/or infer the estimated depth of additional objects rather than delaying to determine estimated depth for every object in the environment, which can improve safety for occupants of an autonomous vehicle. These and other improvements to the functioning of the computer are discussed herein.

In some instances, the techniques discussed herein can be implemented in a system including image sensor(s) (e.g., red-green-blue (RGB) cameras, intensity cameras (greyscale), infrared cameras, ultraviolet cameras, and the like), depth cameras (e.g., RGB-D cameras, time-of-flight sensors, lidar sensors, radar sensors, sonar sensors, and the like, to provide redundancy to the system in the event of hardware or software failure. For example, in the event that a depth camera is occluded or malfunctioning, the techniques discussed herein can be used with an image sensor to provide redundancy and/or backup to ensure that dense depth information can be available under many circumstances. Therefore, the techniques discussed herein can provide additional improvements to, for example, machine-vision systems.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 illustrates a pictorial flow diagram of a process 100 of a vehicle 104 determining additional data based on sensor data. At operation 102, the vehicle 104 can capture sensor data associated with the environment 106. In some instances, the vehicle 104 can include one or more sensors where the one or more sensors can include one or more time-of-flight sensors, lidar sensors, radar sensors, sonar sensors, image sensors, audio sensors, infrared sensors, location sensors, wheel encoders, IMUs, etc., or any combination thereof, although other types of sensors are contemplated. In some examples, the vehicle 104 can capture image data, lidar data, radar data, sonar data, and the like. In one example, the vehicle can include an image sensor capturing image data representing the environment 106.

The vehicle 104 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 104 can be configured to control all functions from start to completion of the trip, including all parking functions, it may not include a driver and/or controls for driving the vehicle 104, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 104 can be any configuration of vehicle, such as, for example, a van, a sport utility vehicle, a cross-over vehicle, a truck, a bus, an agricultural vehicle, and/or a construction vehicle. The vehicle 104 can be powered by one or more internal combustion engines, one or more electric motors, hydrogen power, any combination thereof, and/or any other suitable power sources. Although the vehicle 104 has four wheels, the systems and methods described herein can be incorporated into vehicles having fewer or a greater number of wheels, and/or tires. The vehicle 104 can have four-wheel steering and can operate generally with equal or similar performance characteristics in all directions, for example, such that a first end of the vehicle 104 is the front end of the vehicle 104 when traveling in a first direction, and such that the first end becomes the rear end of the vehicle 104 when traveling in the opposite direction. Similarly, a second end of the vehicle 104 is the front end of the vehicle when traveling in the second direction, and such that the second end becomes the rear end of the vehicle 104 when traveling in the opposite direction. These example characteristics may facilitate greater maneuverability, for example, in small spaces or crowded environments, such as parking lots and/or urban areas.

The vehicle 104 can include a computing device that includes a perception engine and/or a planner and perform operations such as detecting, identifying, segmenting, classifying, and/or tracking objects from sensor data collected from the environment 106. Objects can include other vehicles, cyclists, pedestrians, animals, road markers, signage, traffic lights, buildings, mailboxes, debris, and/or other objects.

The vehicle computing device can include one or more processor(s) and memory communicatively coupled to the one or more processor(s). The one or more processor(s) can include, for example, one or more FPGAs, SoCs, ASICs, and/or CPUs. The vehicle 104 can traverse through the environment 106 and determine and/or capture data. For example, the vehicle computing device can determine vehicle status data, vehicle diagnostic data, vehicle metrics data, and/or map data.

As the vehicle 104 traverses through the environment 106, the sensors can capture sensor data associated with the environment 106. For example, and as discussed above, the vehicle 104 can use image sensors to capture image data as the sensor data. In some instances, the image data can be associated with objects (e.g., vehicles, cyclists, and/or pedestrians). In some instances, the image data can be associated with other objects including, but not limited to, buildings, road surfaces, signage, barriers, etc. Therefore, in some instances, the image data can represent dynamic objects and/or static objects. The dynamic objects can be, as described above, objects that are associated with a movement (e.g., vehicles, motorcycles, cyclists, pedestrians, animals, etc.) or capable of a movement (e.g., parked vehicles, standing pedestrians, etc.) within the environment 106. The static objects can be, as described above, objects that are associated with the environment 106 such as, for example, buildings/structures, road surfaces, road markers, signage, barriers, trees, sidewalks, etc.

At operation 108, the vehicle 104 can input the sensor data to a machine-learned model 110 to determine depth data 112. As discussed herein, a machine-learning model can be trained to determine the depth data 112 based on the image data. To train the machine-learning model, image data and ground truth data (e.g., lidar associated with the image data) data can be input into a machine-learning model. For example, the training data can be input to a machine-learning model where a known result (e.g., a ground truth, such as a known depth value) can be used to adjust weights and/or parameters of the machine-learning model to minimize an error.

After training, the vehicle 104 can use the machine-learned model 110 to generate the depth data 112 associated with the image data of the environment 106. As depicted in FIG. 1, the depth data 112 can be represented as a point cloud where individual pixels of the image data are associated with a depth. In some examples, the depth can correspond to a distance between an image sensor and a portion of the environment represented by a pixel or can correspond to a distance between a virtual origin and the portion of the environment represented by the pixel.

At operation 114, the vehicle 104 can determine, based at least in part on the depth data 112, additional data. As discussed above, the vehicle 104 can perform operations and generate data such as location data 116, three-dimensional bounding box data 118, and/or relative depth data 120. Additional examples of determining the location data 116 are discussed in connection with FIGS. 2-4, as well as throughout this disclosure. Additional examples of determining the three-dimensional bounding box data 118 are discussed in connection with FIGS. 5-7, as well as throughout this disclosure. Additional examples of determining the relative depth data 120 are discussed in connection with FIGS. 8-10, as well as throughout this disclosure.

Figure 2:
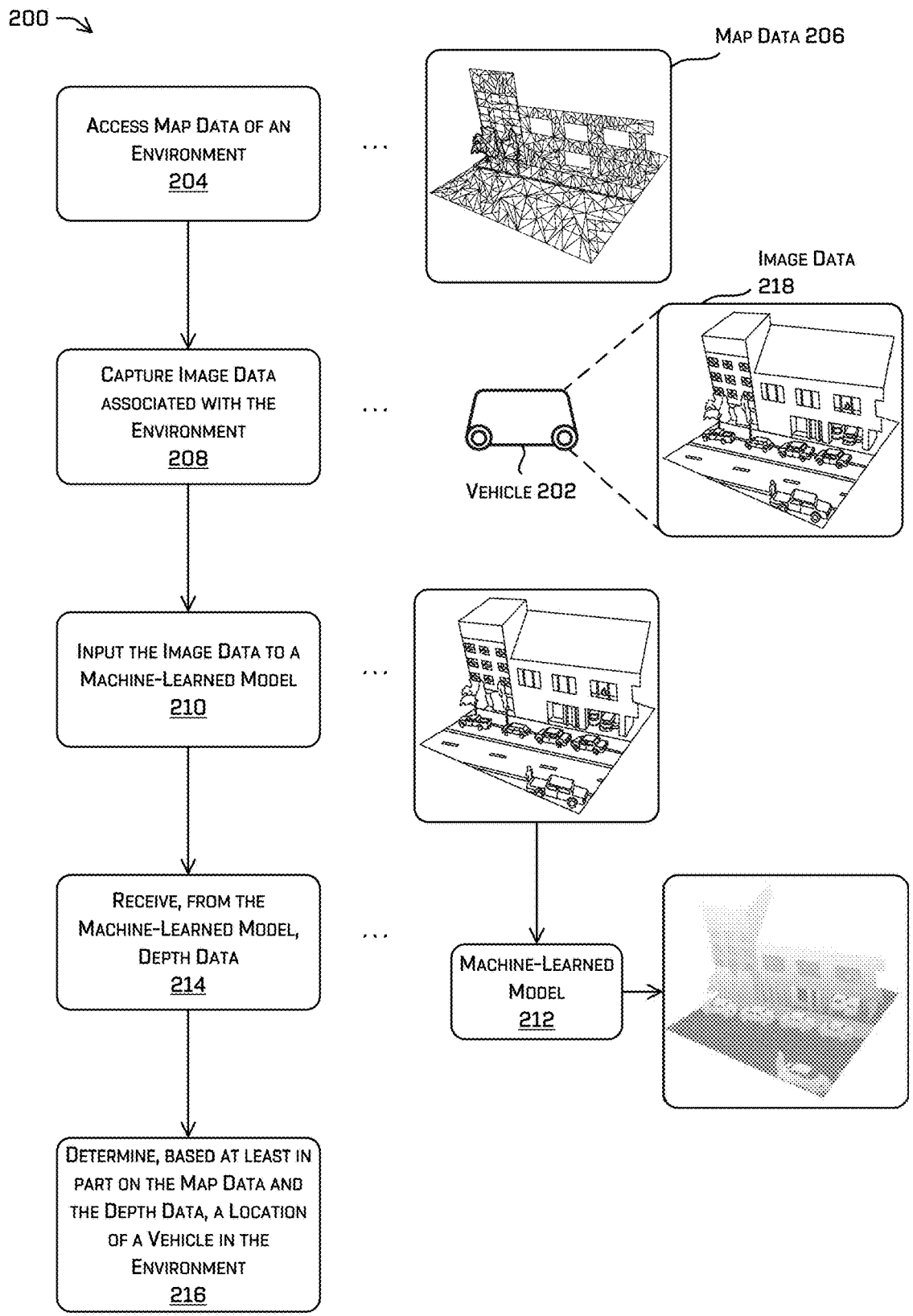
FIG. 2 is a pictorial flow diagram of an example process of accessing map data, receiving depth data, and determining a location of a vehicle in an environment.

FIG. 2 illustrates a pictorial flow diagram of a process 200 of a vehicle 202 determining a location of the vehicle 202 in an environment. Some portions of the process 200 can be omitted, replaced, and/or reordered while still providing the functionality of determining a location of the vehicle in an environment. In at least one example, the vehicle 202 can be similar to the vehicle 104 described above with reference to FIG. 1.

At operation 204, the vehicle 202 can access map data 206 of an environment. In some instances, the vehicle 202 can access the map data 206 that is locally stored in a memory of the vehicle 202 and/or via map data stored remotely from the vehicle 202 (e.g., via a network). As discussed above, the map data 206 can be a three-dimensional global map and/or a mesh. The mesh can include polygons that represent objects in the environment, although other data structures to represent the map data 206 are contemplated.

In some instances, the vehicle 202 can be communicatively coupled, via a network, to one or more remote computing devices, such as a map data server. The vehicle 202 can, during operation, access the map data 206 from the map data server. In some instances, the vehicle 202 can store a copy of the map data 206 within the vehicle 202 and access the map data 206 locally without requiring the network to access the map data server. In some instances, the vehicle 202 can be prepopulated with the map data 206 and, during operation, receive updates to the map data 206 via the network from the map data server.

At operation 208, the vehicle 202 can capture image data associated with the environment. As discussed above, the vehicle 202 can use sensors such as image sensors to capture the sensor data as image data. Such image data captured by the vehicle 202 is represented in FIG. 2 as image data 218.

At operation 210, the vehicle 202 can input the image data to a machine-learned model 212. As discussed above, the machine-learned model 212 can be trained to generate depth data based on image data. At operation 214, the vehicle 202 can receive the depth data from the machine-learned model 212. In some examples, the machine-learned model 212 can correspond to the machine-learned model 110.

At operation 216, the vehicle 202 can determine, based at least in part on the map data 206 and the depth data 112, a location of the vehicle 202 in the environment. For example, the operation 216 can include using one or more localization algorithms to fit the depth data 112 to the map data 206, whereby a best-fit between the map data 206 and the depth data 112 (e.g., as determined by an error) can correspond to a location of the vehicle 202.

Figure 3:
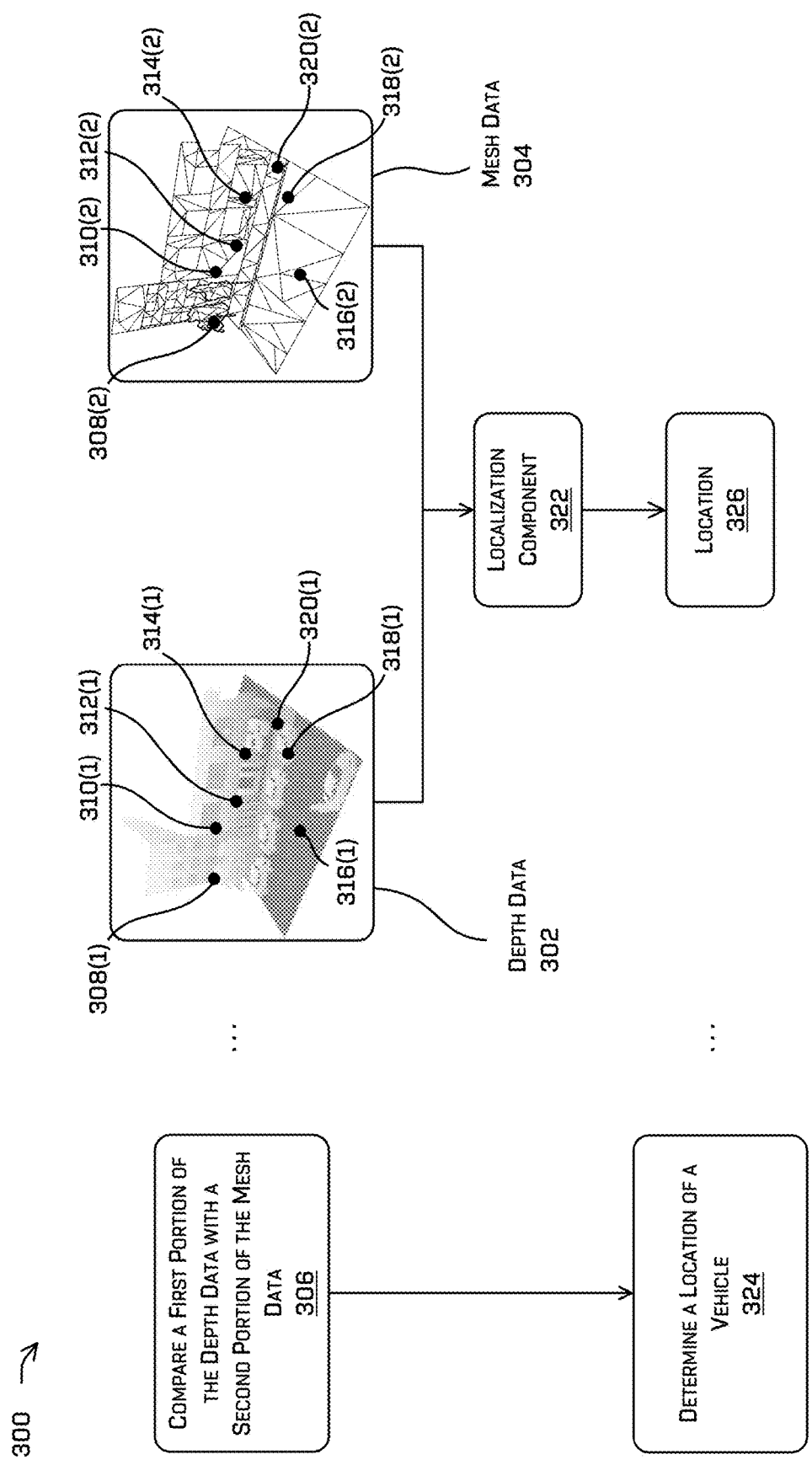
FIG. 3 is a pictorial flow diagram of an example process of comparing depth data with mesh data to determine a location of a vehicle in an environment

FIG. 3 illustrates a pictorial flow diagram of a process 300 for determining a location of a vehicle using depth data 302 and map data (e.g., mesh data 304). As discussed above, a vehicle can access mesh data 304 that is stored on the vehicle and/or from a map data server.

At operation 306, the vehicle can compare a first portion of the depth data 302 with a second portion of the mesh data 304. The data points 308(1), 310(1), 312(1), 314(1), 316(1), 318(1), and 320(1) can indicate discrete data points in the depth data 302 associated with the environment. The data points 308(2), 310(2), 312(2), 314(2), 316(2), 318(2), and 320(2) can indicate discrete data points in the mesh data 304 that (when the depth data 302 is optimally aligned with the mesh data 304), correspond to polygons in the mesh data 304 and the data points 308(1), 310(1), 312(1), 314(1), 316(1), 318(1), and 320(1). In some instances, the depth data 302 can have more or fewer data points than illustrated in FIG. 3.

A localization component 322 of the vehicle can compare and/or analyze the depth data 302 and the mesh data 304 including the data points 308(1), 310(1), 312(1), 314(1), 316(1), 318(1), and 320(1) and 308(2), 310(2), 312(2), 314(2), 316(2), 318(2), and 320(2) using, for example, localization algorithms such as an iterative closest point algorithm, a robust point matching algorithm, a kernel correlation algorithm, a coherent point drift algorithm, or a sorting correspondence space algorithm, although other localization algorithms are contemplated. Examples of localization algorithms can be found, for example, in U.S. patent application Ser. No. 15/675,487 titled "Sensor Perturbation" and filed Aug. 11, 2017 (describing, in part, search algorithms to localize a vehicle).

An operation 324, the localization component 322 can determine a location 326 and/or orientation (e.g., pose) of the vehicle. The localization component 322 can fit the depth data 302 and data points 308(1), 310(1), 312(1), 314(1), 316(1), 318(1), and 320(1) into the corresponding polygons of the mesh data 304 at data points 308(2), 310(2), 312(2), 314(2), 316(2), 318(2), and 320(2). As can be understood, the vehicle can capture sensor data associated with any number of points, and the points illustrated are merely exemplary. In some instances, operations 306 and 324 can be performed as a single operation.

In some examples, the process 300 can be used to determine a location of a vehicle in an environment. In some examples, if a location of the vehicle is known, the process 300 can be used to determine and/or evaluate a calibration of extrinsic data (e.g., placement of a sensor, orientation of a sensor, etc. relative to a global map or mesh) associated with one or more sensors of the vehicle. For example, if a first calibration results in a first location, and a first location is different than a known location of the vehicle, the difference can be used to determine a second calibration of one or more sensors of the vehicle. In some instances, the difference can be based on sensor intrinsics (e.g., a focal length of a sensor, a lens distortion parameter associated with a sensor, an image center of a sensor, etc.). The depth data can be used to generate an image be compared against an assumed image based at least in part on the sensor intrinsics. In some examples, the difference can be used to generate a transformation between the first location (e.g., captured using a sensor) and the known location (e.g., the actual location of a vehicle with respect to a map) using a bundle adjustment or least squares optimization algorithm. In some examples, the updated calibration can be based on the difference and/or transformation.

Figure 4:
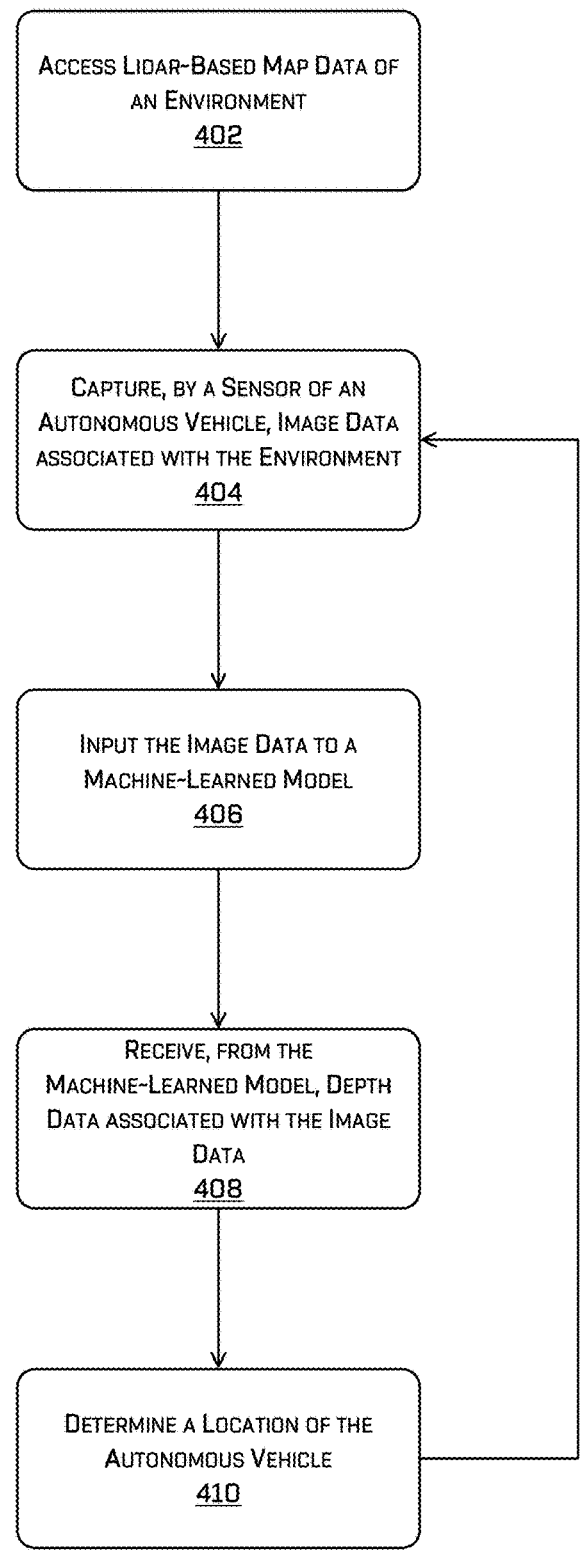
FIG. 4 is an example process for determining a location of an autonomous vehicle.

FIG. 4 illustrates an example process 400 for determining a location of an autonomous vehicle. Additionally, some portions of process 400 can be omitted, replaced, and/or reordered while still providing the functionality of determining a location of the autonomous vehicle.

At operation 402, a vehicle can access lidar-based map data of an environment. As discussed above, the vehicle can access the lidar-based map data, via a network, from a map data server. In some instances, the vehicle can store the map data locally. The map data can comprise a three-dimensional map of the environment, a mesh of the environment, and/or a voxel-based map of the environment.

At operation 404, the vehicle can capture, by a sensor of the vehicle, image data associated with the environment. In some instances, the vehicle can use more than one image sensor to capture the image data and combine multiple images to generate the image data of the environment.

At operation 406, the process 400 continues by inputting the image data to a machine-learned model. As discussed above, the machine-learned model can be trained to generate depth data associated with the image data.

At operation 408, the vehicle can receive, from the machine-learned model, depth data associated with the image data. As discussed above, the depth data can be represented as a point cloud that is associated with the image data and the environment. In some instances, individual pixels of the image data can be associated with a depth of the depth data.

At operation 410, the vehicle can, using the localization component, determine a location of the vehicle. In some instances, the vehicle can perform a localization operation and compare a first portion of the map data with a second portion of the depth data. As discussed above, the map data can comprise a mesh that includes polygons to represent the environment. The localization component can compare a set of points of the depth data with at least a portion of the mesh to determine corresponding polygons.

Figure 5:
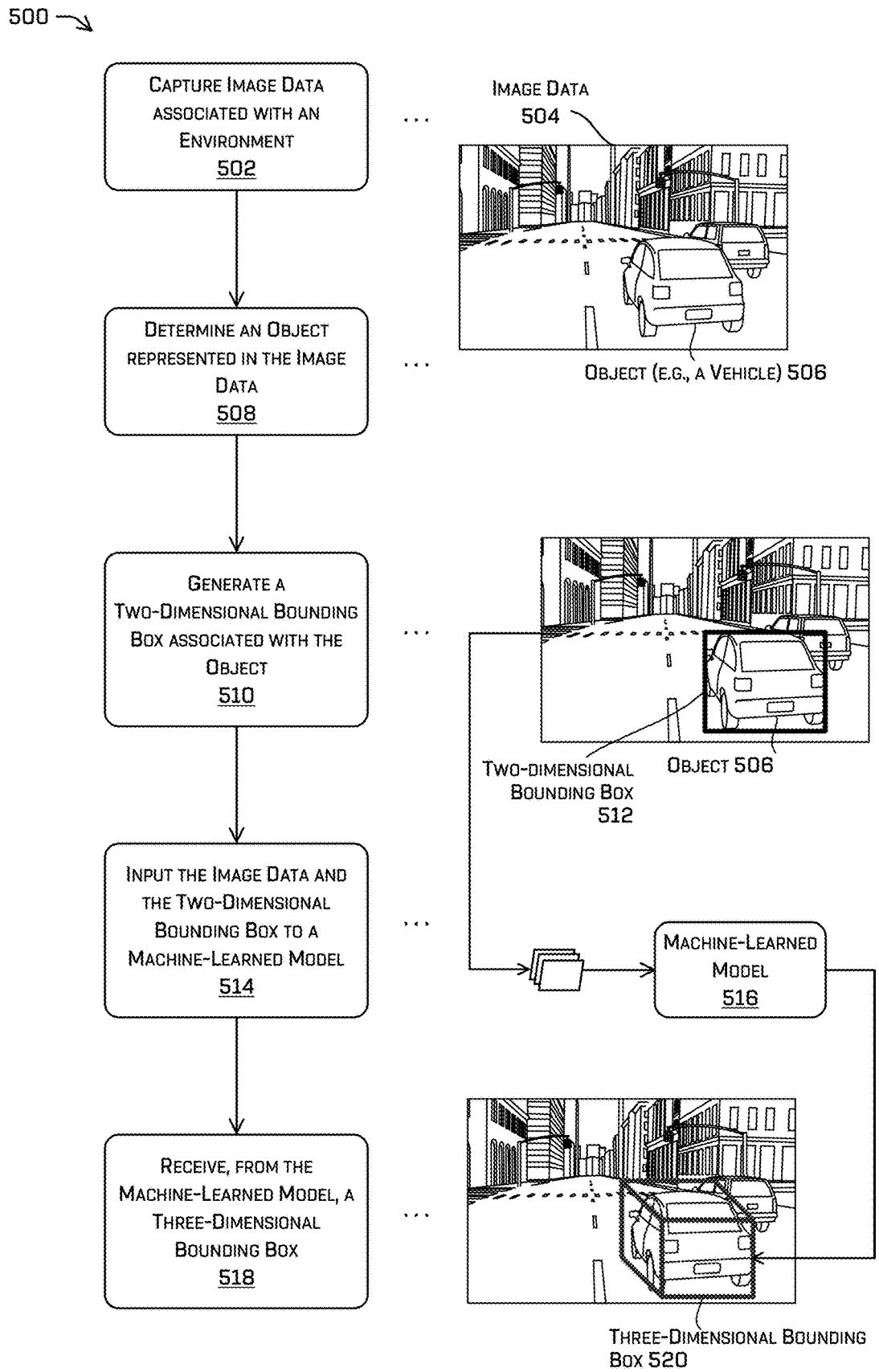
FIG. 5 is a pictorial flow diagram of an example process of determining an object represented in image data associated with an environment and receiving a three-dimensional bounding box associated with the object.

FIG. 5 illustrates a pictorial flow diagram of a process 500 for determining a three-dimensional bounding box associated with an object. Some portions of the process 500 can be omitted, replaced, and/or reordered while still providing the functionality of determining a three-dimensional bounding box associated with an object.

At operation 502, a vehicle can capture image data 504 of an environment that includes an object 506 (e.g., a vehicle).

At operation 508, the vehicle can use an algorithm to determine the object 506 represented in the image data 504. For example, the vehicle can use a classification algorithms to determine that object 506 is present in the image data 504.

At operation 510, the vehicle can generate a two-dimensional bounding box 512 associated with the object 506. In some instances, the vehicle can use detection algorithms to create, based on the image data captured in the operation 502, the two-dimensional bounding boxes around the object 506. In some instances, the vehicle can use a different machine-learned model to generate the two-dimensional bounding boxes. As illustrated in FIG. 5, the two-dimensional bounding box 512 is positioned and sized to completely encompass the object 506 within the image data 504.

At operation 514, the image data 504 and the two-dimensional bounding box 512 are input into a machine-learned model 516. As discussed above, the machine-learned model can be trained generate three-dimensional bounding boxes based on image data and two-dimensional bounding boxes. In some instances, the operation 514 can include inputting the image data 504 into a machine-learned model without inputting the two-dimensional bounding box 512. That is, in some cases, the two-dimensional bounding box 512 may or may not be input to a machine-learned model, depending on an implementation of the techniques discussed herein.

At operation 518, the vehicle can receive a three-dimensional bounding box 520 associated with the object 506 that is generated by the machine-learned model 516. As discussed above, the three-dimensional bounding box 520 can represent a minimum volume cuboid that partially or fully encompasses the object 506 and provide information such as a location, orientation, pose, and/or size (e.g., length, width, height, etc.) associated with the object 506.

Figure 6:
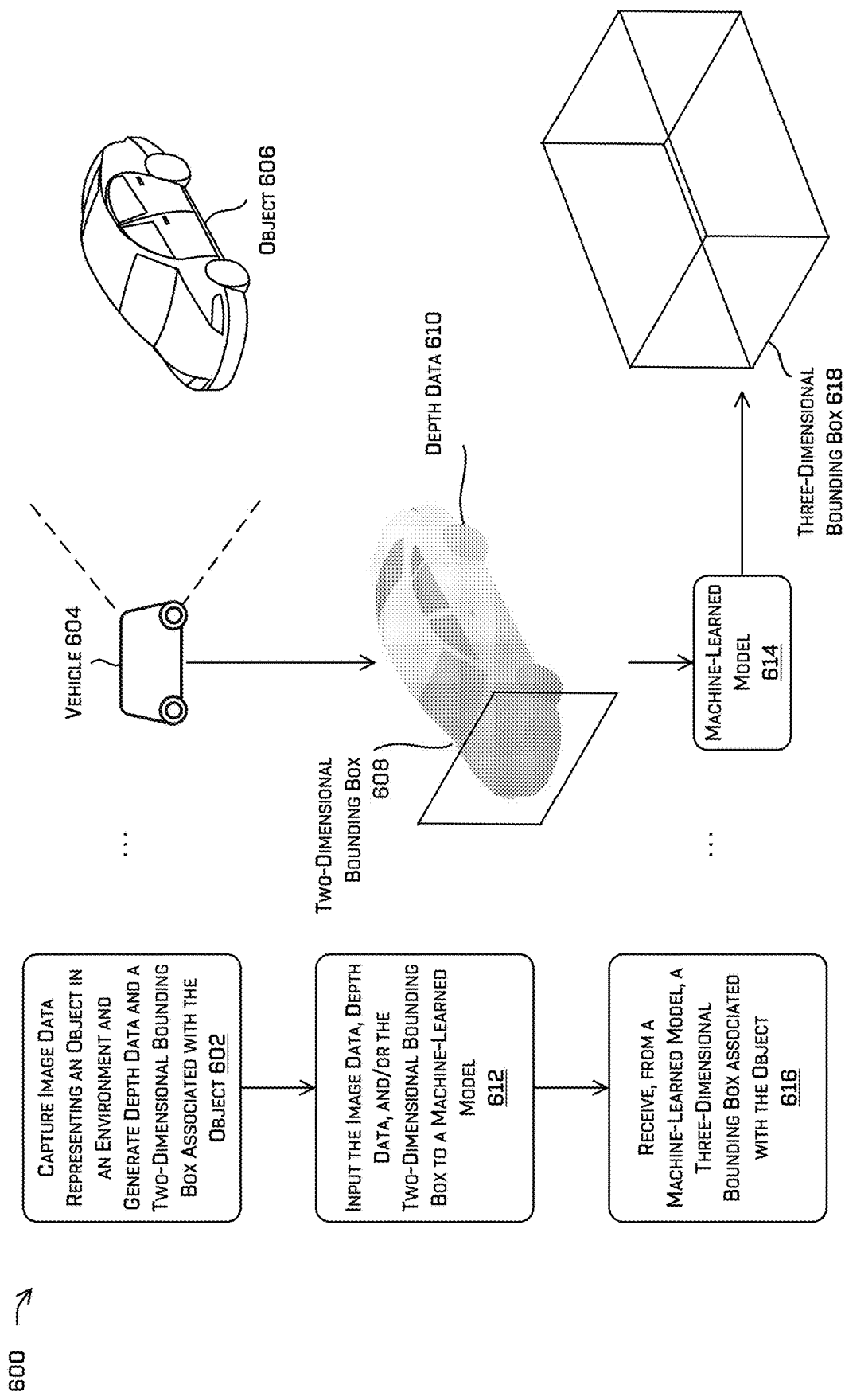
FIG. 6 is a pictorial flow diagram of capturing image data representing an object and receiving a three-dimensional bounding box and depth data associated with the object.

FIG. 6 illustrates a pictorial flow diagram of a process 600 for determining a three-dimensional bounding box.

At operation 602, a vehicle 604 can capture image data that represents an object 606 in an environment. In some instances, a perception system of the vehicle 604 can be used to generate a two-dimensional bounding box 608 associated with the object 606 based on the image data (e.g., performing a detection for an object in image data). In some instances, the vehicle can input the image data into a machine-learned model to determine monodepth data or depth data 610. The depth data 610 can be represented as a point cloud and/or the depth data 610 can provide a plurality of depths for individual pixels of the image data. In some instances, segmentation operations can be performed to generate the plurality of depths only associated with the object 606. For purposes of illustration only, two-dimensional instance segmentation can be used to remove depth data associated with a ground surface, building(s), or other object(s) that may be present within an image crop.

At operation 612, the image data, the depth data 610, and/or the two-dimensional bounding box is input into a machine-learned model 614. As discussed above, the machine-learned model can be trained to generate three-dimensional bounding boxes based on, for example, two-dimensional/three-dimensional bounding box pairs as ground truth data and/or other sensor data (e.g., image data, radar data, lidar data, and the like). In some instances, the machine-learned model trained to generate the depth data 610 can be the same machine-learned model 614 trained to generate three-dimensional bounding boxes (e.g., where there are different portions/heads/pathways of the architecture which correspond to different output types—depth, bounding boxes, etc.).

At operation 616, a three-dimensional bounding box 618 is received from the machine-learned model that is associated with the object 606.

Figure 7:
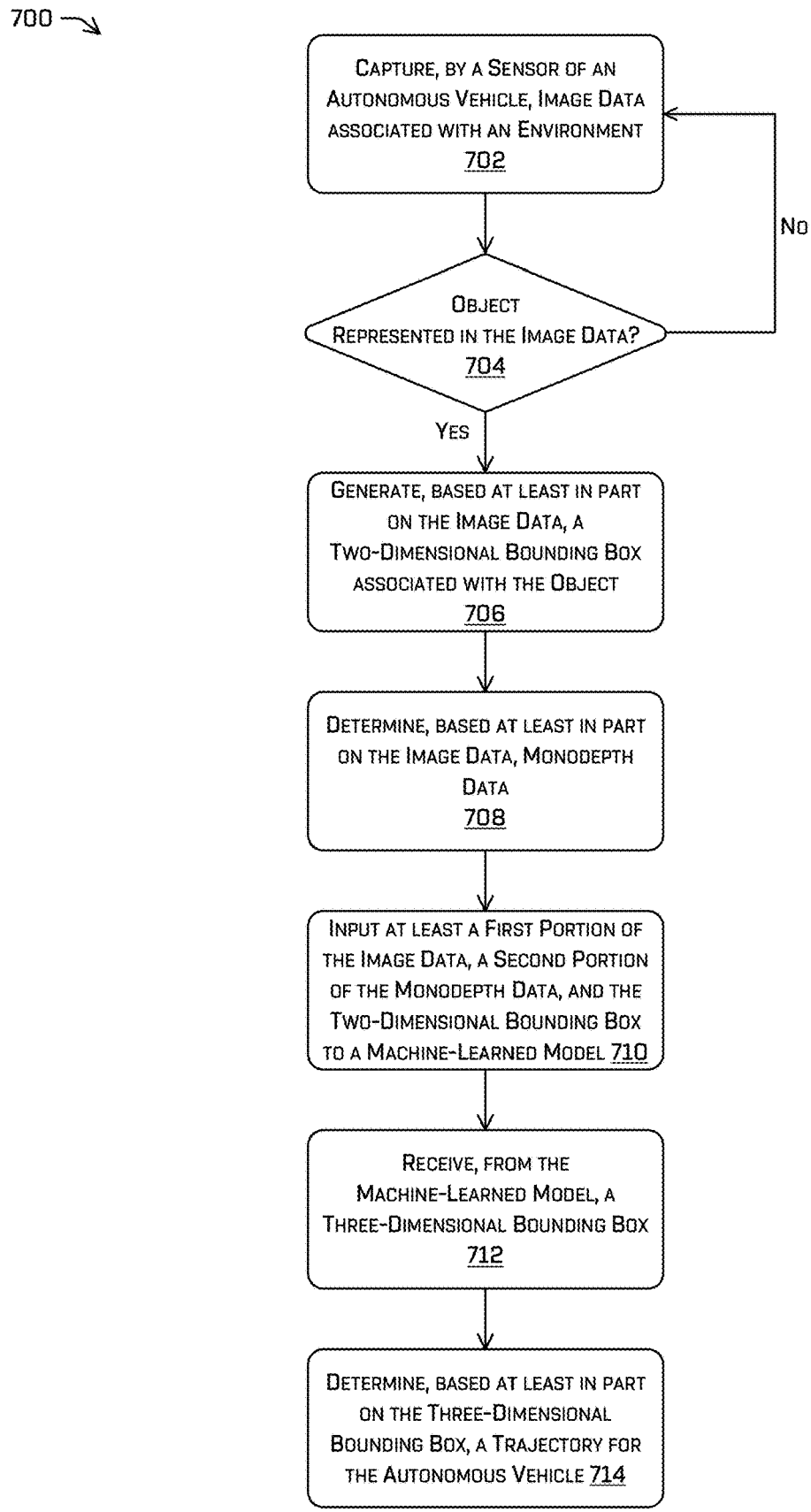
FIG. 7 is an example process for associating a two-dimensional bounding box with a three-dimensional bounding box.

FIG. 7 illustrates an example process 700 for associating a two-dimensional bounding box with a three-dimensional bounding box. Additionally, some portions of process 700 can be omitted, replaced, and/or reordered while still providing the functionality of associating a two-dimensional bounding box with a three-dimensional bounding box.

At operation 702, an autonomous vehicle can capture, by a sensor of the autonomous vehicle, image data associated with an environment.

At operation 704, the process 700 can determine whether an object is represented in the image data. As discussed above, classification algorithms can be used to determine whether an object is represented in the image data, although other algorithms are contemplated. If an object is not represented in the image data, the process 700 returns to operation 702 to continue capturing image data. If an object is represented in the image data, the process 700 proceeds to operation 706.

At operation 706, the process 700 can generate, based at least in part on the image data, a two-dimensional bounding box associated with the object. As discussed above, detection algorithms can be used to generate the two-dimensional bounding box that encompasses the detected object in the image data.

At operation 708, the process 700 can determine monodepth data based at least in part on the image data. In some instances, as discussed above, the monodepth data can be depth data generated by a machine-learned model to generate depth data based on image data.

At operation 710, a first portion of the image data, a second portion of the monodepth data, and/or the two-dimensional bounding box is input to a machine-learned model that is trained to generate three-dimensional bounding boxes. In some instances, the image data can be input into the machine-learning model without the two-dimensional bounding box. In some instances, the machine-learned model trained to generate three-dimensional bounding boxes can be the same machine-learned model trained to generate the monodepth data, as described above.

At operation 712, the process can include receiving, from the machine-learned model, a three-dimensional bounding box. As discussed above, the three-dimensional bounding box can provide information including a location, orientation, pose, and/or size (e.g., length, width, height, etc.) associated with the object.

At operation 714, the process 700 continues by determining, based at least in part on the three-dimensional bounding box, a trajectory for the autonomous vehicle.

Figure 8:
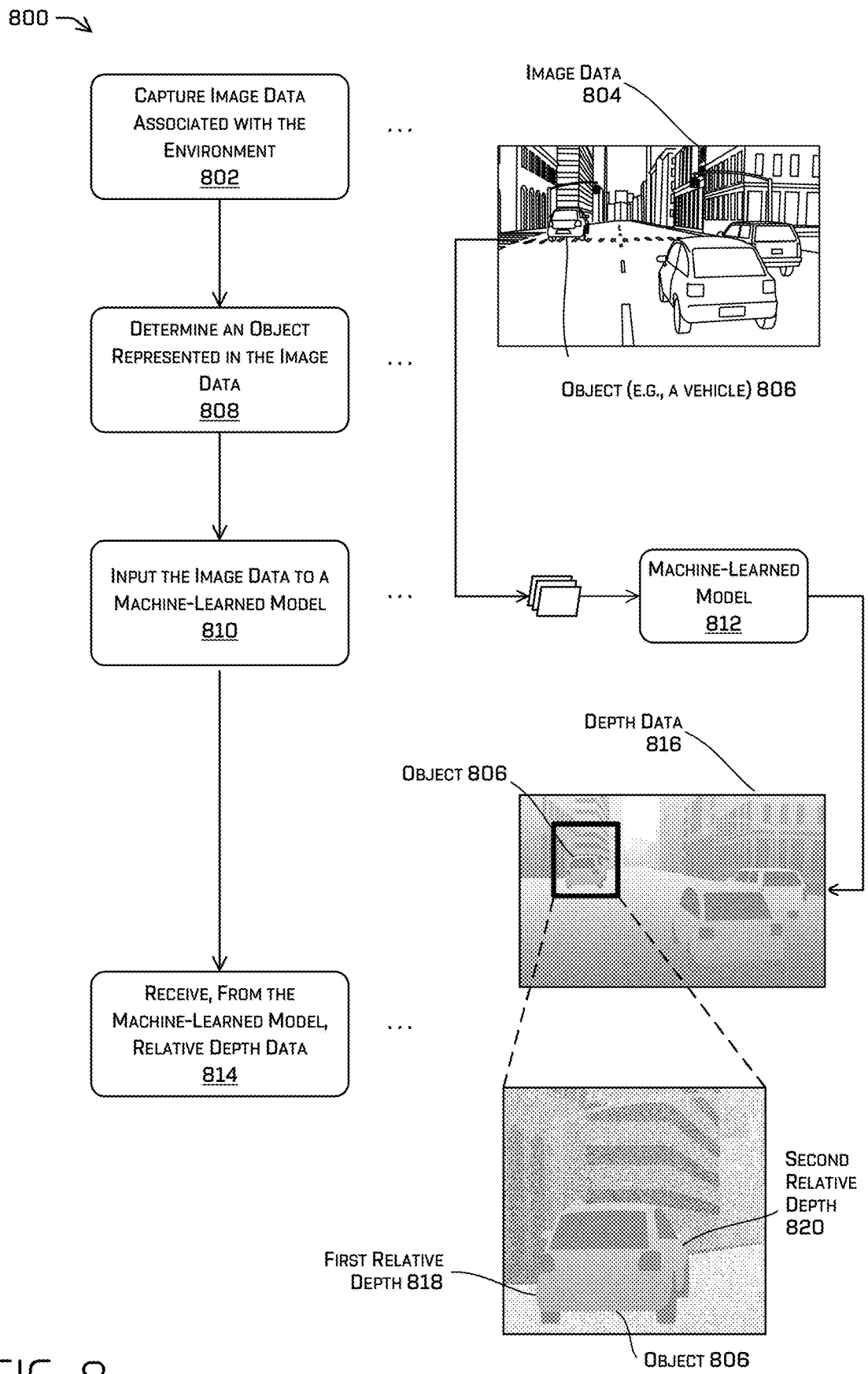
FIG. 8 is a pictorial flow diagram of determining an object represented in image data and receiving relative depth data associated with the object.

FIG. 8 illustrates a pictorial flow diagram of a process 800 for receiving relative depth data. Some portions of the process 800 can be omitted, replaced, and/or reordered while still providing the functionality of receiving relative depth data.

At operation 802, a vehicle can capture image data 804 associated with an environment. As depicted in FIG. 8, the environment can include an object 806 such as a vehicle.

At operation 808, the vehicle can determine that the object 806 is represented in the image data 804. Such a determination may comprise, for example, a (two-dimensional) bounding box associated with the object. As discussed above, the vehicle can use classification algorithm(s) to determine that the object 806 is represented in the image data 804. In various examples, depth data from one or more additional sensors (e.g., lidar, etc.) may be associated with the object.

At operation 810, the image data 804 can be input into a machine-learned model 812. In at least some examples, depth data from a depth sensor associated with an object may be input into a machine learned model 812 along with the image data 804, as well as a location the anchor depth falls projects into the image (e.g., a u,v-coordinate in image coordinates). The machine-learned model 812 can be trained to generate relative depth data.

For example, the vehicle can capture captured image data 804 using an image sensor (e.g., a camera) and depth data using a depth sensor (e.g., a lidar sensor). Portions of the image data 804 can be associated with the captured depth data. As discussed above, the machine-learned model 812 can generate depth data 816 based on at least a portion of the image data 804 (e.g., that portion associated with the object) and/or the depth data associated therewith.

In some instances, the depth data 816 generated by the machine-learned model 812 can be associated with confidence value(s). In some instances, the machine-learned model 812 can generate the depth data 816 and the associated confidence value(s). For example, portions of the depth data 816 that are closer to the vehicle can be associated with higher confidence values than portions of the depth data 816 that are farther from the vehicle (e.g., which may be due to a lower amount of data since the vehicle is far away). A low confidence value can indicate an uncertainty associated with the portion of the depth data 816. In some instances, portions of the depth data 816 that are associated with a lower confidence value can be associated with sparse depth data (e.g., sparse lidar data and/or captured depth data). For purposes of illustration only, the depth data 816 can include estimated depth data where the estimated depth data for a first object is associated with a lower confidence value than the depth data for a second object that is closer to the vehicle. As described in detail herein, those regions of monocular image based depth data associated with a low confidence level may be supplemented by determining relative depth data using an associated reference (or anchor) point, as will be described in detail below.

The relative depth data generated by the machine-learned model 812 can indicate depths relative to a reference point (and/or a reference region) in the image data 804. For purposes of illustration only, the machine-learned model 812 can identify or otherwise determine, as a reference point, a point associated with a confidence value that does not meet a confidence threshold as the reference point. As will be shown in FIG. 9, if a region of the image is associated with low depth confidence, a relative depth may be generated based on an associated depth measurement (e.g., a lidar point) in order to supplement such an area with high confidence depth estimates. In some instances, the machine-learned model 812 can determine a reference point/region that is associated with a sparse depth data region (e.g., sparse lidar data and/or captured depth data). Then, the machine-learned model 812 can determine relative depth data that indicates depth relative to the reference point/region. As one, non-limiting, example, the reference point/region input into the network can be used as the depth to which the output is relative. In such examples, while the output associated with neighboring pixels of the relative depth image of the network may be, for example, 0.1 m, 0.12 m, 0.1 m, −0.05 m, etc., an anchor depth of 5 m (determined by, for example, lidar data) could then be used to determine actual depths over the object in the world.

In some instances, ground truth data (e.g., from lidar data and/or other sensor data) associated with the image data 804 can be used to train the machine-learned model. Such ground truth may, for example, be associated with those scenarios in which image data corresponds to higher densities of depth data (e.g., when the object is perceived closer to the sensors).

At operation 814, the relative depth data is received. As depicted in FIG. 8, and as discussed above, the machine-learned model 812 can generate depth data 816. The depth data 816 can include the relative depth data. As discussed herein, relative depth can refer to a depth value that is defined with respect to a depth of another point, pixel, region, etc., of an environment.

The relative depth data can include a first relative depth 818 and a second relative depth 820 that is associated with the object 806. As discussed above, the relative depth data can indicate depth data that is relative to a reference. For purposes of illustration only, the first relative depth 818 can serve as the reference and the second relative depth 820 can be based on the first relative depth 818 (for instance, the first relative depth 818 may be a single depth data point which corresponds to the object, such as when the object is very distant). For purposes of illustration only, a perception component of a vehicle can determine, based on the first relative depth 818 and the second relative depth 820, a relative length of object 806. The relative length (and/or the first relative depth 818 and the second relative depth 820) can be a placeholder value(s) until sufficient captured depth data is obtained to determine estimated depth data and an estimated length of the object 806 and/or other relative dimensions associated with the object. In any such examples above, even though the depth data associated with the object is sparse (and in some cases, a single point), a more robust and complete depth over the object can be provided. This relative depth may, in turn, be used for better planning, tracking, perception, detection, prediction, and control of an autonomous vehicle, for example, as a better depth profile of the object may be resolved, despite sparsity of depth measurements and/or distance from the sensor.

For example, a perception system of the vehicle can track an object as the vehicle and/or the object traverses an environment. Such track information may comprise, for example, historical positions, velocities, accelerations, yaw rates, lighting states (blinkers, brake lights, etc.), etc. In some instances, the vehicle can log the tracking of the object where the log can store a path along with the object has traversed as detected by the vehicle. As the object traverses the environment, the object can be at a region of the environment where the sensor data of the vehicle contains sparse depth data, or otherwise enter a region in which measurements of a depth sensor are insufficient to continue tracking such an object (e.g., where the depth measurements are too sparse). In some instances, as described above, the vehicle can use image data to generate image-based depth data and the object can be at a region of the environment where the image-based depth data of that region is associated with low confidence values, though such a region may generally be associated with insufficient depth data to continue tracking. As discussed above, the low confidence values can indicate an uncertainty of the depth data of the region. Therefore (without using the techniques discussed herein), the vehicle may have difficulty tracking the object in a region of the environment that is associated with sparse depth data and/or depth data with low confidence values. By implementing the techniques described herein, the vehicle can more accurately track the object through a region of an environment associated with sparse depth data and/or depth data with low confidence values by determining relative depth data and estimated depth data associated with the region. Of course, though the concept of tracking is described in detail herein, any other application of such relative depth estimations may be used.

Figure 9:
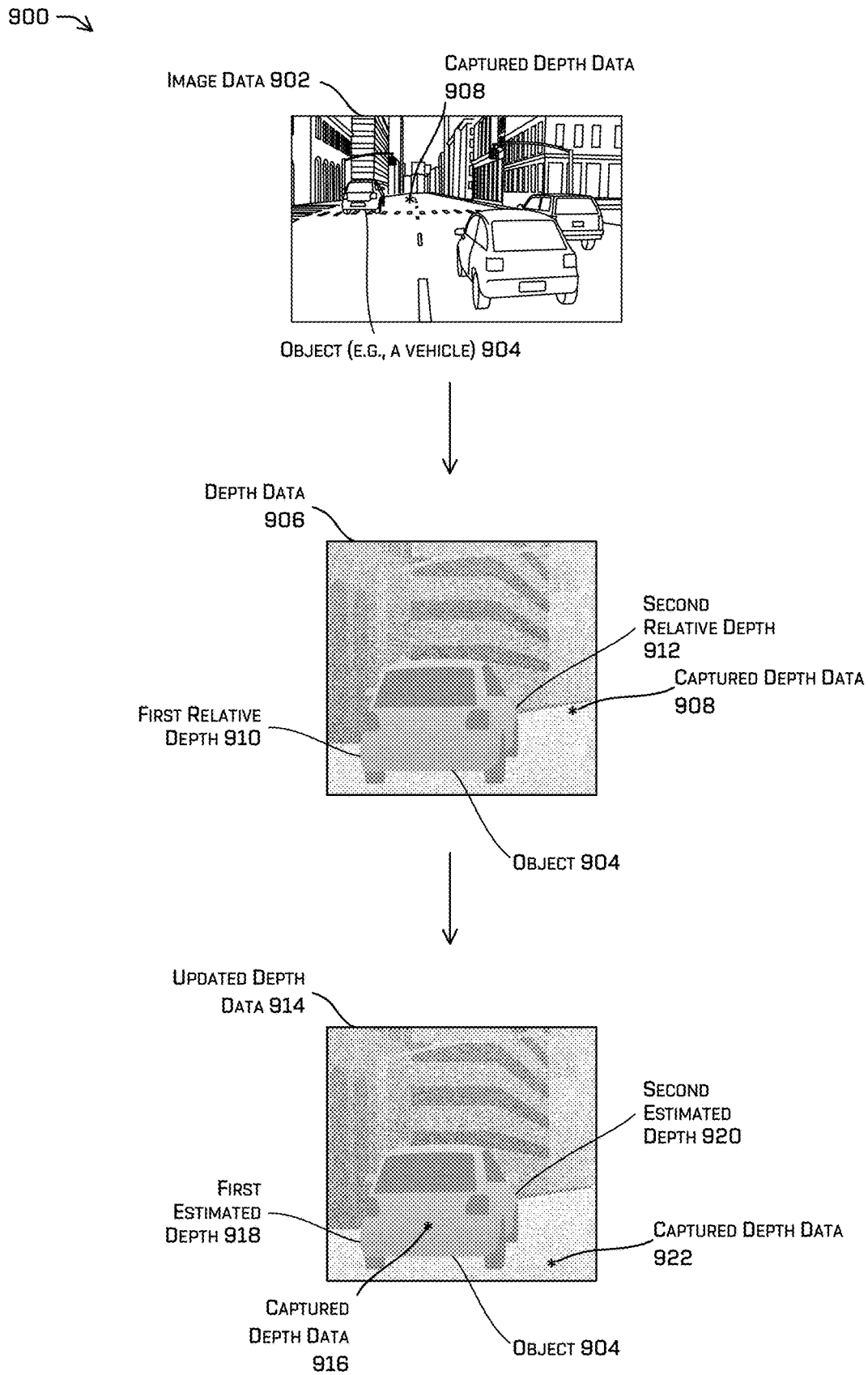
FIG. 9 illustrates an example process of determining relative depth data and determining estimated depth data based on captured depth data.

FIG. 9 illustrates an example process 900 for determining estimated depth data based on relative depth data. The image data 902 can represent an object 904 such as a vehicle.

The example process 900 illustrates an environment in which depth data 906 is output by a machine-learned model, as discussed herein. Further, as illustrated, the sensor data of the vehicle can include captured depth data 908 that may not correspond to the object 904 represented in the depth data 906 and can indicate that the object 904 is in a sparse depth data region and/or in a region associated with low confidence values. In some examples, the machine-learned model can output a first relative depth 910 and second relative depth data 912 associated with the object 904. As discussed above, in some instances, the first relative depth 910 can serve as a reference point for other relative depth data where the relative depth data can act as placeholder until sufficient captured depth data is obtained to determine estimated depth data. In some examples, the machine-learned model can output relative depth data when a distance between a vehicle, a sensor, and/or a virtual origin meets or exceeds a threshold.

As depicted in FIG. 9, the captured depth data 908 can represent depth data, such as a depth value as determined from lidar data captured by a lidar sensor. However, in some instances, the captured depth data 908 can be insufficient to determine estimated depth data associated with object 904. As discussed above, the object 904 can be in a region of the environment that is associated with sparse depth data and/or low confidence values associated with portions of the depth data 906.

As depicted in FIG. 9, captured depth data 916 is associated with the object 904. In such an event, a computing device can use the captured depth data 916 as an "anchor" to determine updated depth data 914. The updated depth data 914 can include a first estimated depth 918 and/or a second estimated depth 920 and/or other estimated dimensions associated with the object 904. As depicted in FIG. 9, the captured depth data 916 can be associated with the object 904. In some instances, the captured depth data 916 can be provided by a lidar sensor, although other sensors that provide depth data are contemplated. In some instances, a computing device can use captured depth data 922 to determine the first estimated depth 918 and the second estimated depth 920. As depicted in FIG. 9, the captured depth data 922 is not associated with the object 904. In some instances, the captured depth data 922 can meet or exceed a separation threshold which can allow the computing device to determine estimated depths for nearby objects and/or regions of the depth data 906.

In some instances, the captured depth data 916 and/or captured depth data 922 can be captured at a time that is after the captured depth data 908. For purposes of illustration only, the vehicle can traverse an environment and detect object 904 in the environment. Additionally, the vehicle can, using a depth sensor (e.g., a lidar sensor, time-of-flight sensor, etc.), capture captured depth data 908 at a first time. As discussed above, the object 904 can be in a region associated with sparse depth data and/or low confidence values. At a second time after the first time, the vehicle can capture captured depth data 916 and/or captured depth data 922. Therefore, as discussed above, the vehicle can track the object 904 through the region associated with sparse depth data and/or low confidence values by determining the depth data 906 and the updated depth data 914 from the first time to the second time. Of course, the reverse may be performed as well (e.g., in the case of a distant vehicle approaching an autonomous vehicle). By relying on relative depth data, the autonomous vehicle may be able to begin tracking the object much earlier, thereby enabling safer operations while traversing the environment.

Though described in terms of tracking an object, the techniques described herein are not meant to be so limiting. In general, various systems may rely on depth measurements from a depth sensor to perform one or more actions and, when such information becomes insufficient, rely on such relative depth estimates as described in detail herein.

Figure 10:
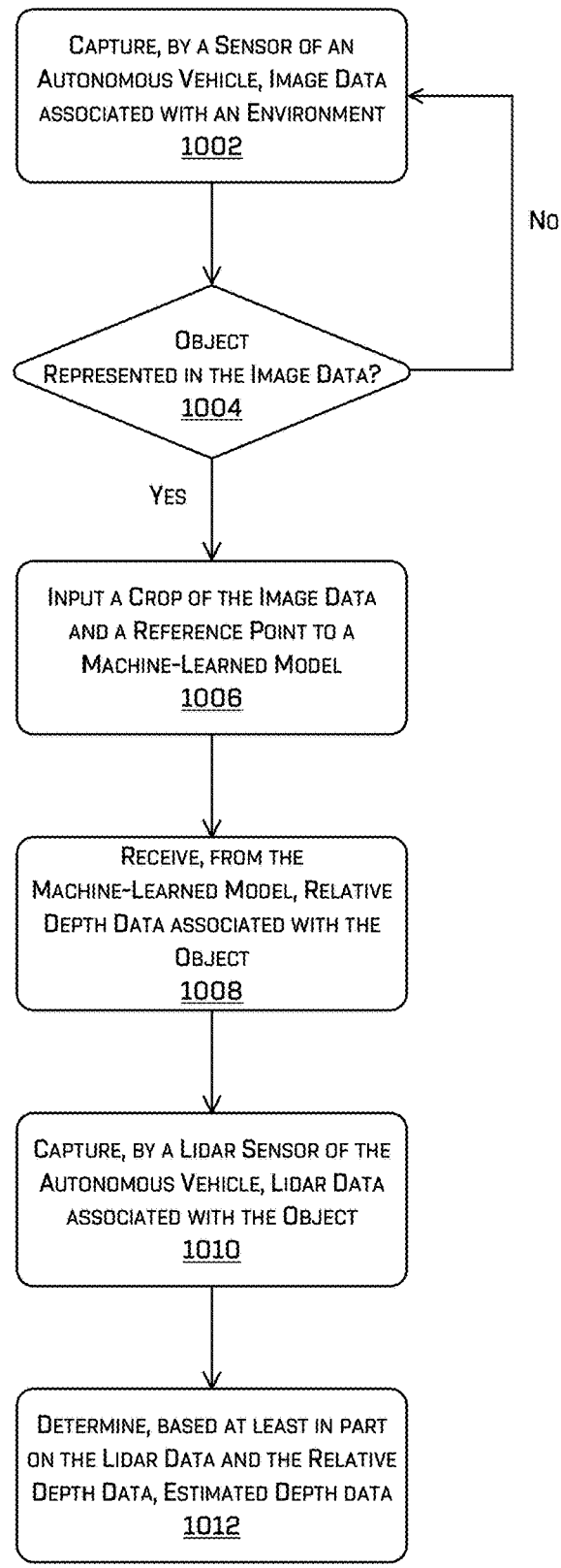
FIG. 10 is an example process of receiving relative depth data from a machine-learned model.

FIG. 10 illustrates an example process 1000 for receiving relative depth data associated with an object. Additionally, some portions of process 1000 can be omitted, replaced, and/or reordered while still providing the functionality of receiving relative depth data associated with an object.

At operation 1002, an autonomous vehicle can capture image data associated with an environment.

At operation 1004, the process 1000 can determine whether an object is represented in the image data. If an object is not represented in the image data, the process 1000 can return to operation 1002 and capture additional image data. If an object is represented in the image data, the process 1000 can proceed to operation 1006.

At operation 1006, a crop of the image data and a reference point are input into a machine-learned model that is trained to generate relative depth data. As discussed above, the crop of the image data can be determined using segmentation operations to isolate portions of the image data associated with the object. Additionally, and as discussed above, the reference point can serve as a point and/or a region for determining relative depth data that is relative to the reference point/region.

At operation 1008, the relative depth data that is associated with the object is received from the machine-learned model. The relative depth data can comprise relative depths for pixels of the crop of the image data that is relative to the reference point/region.

At operation 1010, a lidar sensor of the autonomous vehicle can capture lidar data associated with the object. In some instances, the autonomous vehicle can capture lidar data while determining relative depth data associated with objects of the environment.

At operation 1012, the process 1000 can determine estimated depth data based at least in part on the lidar data and the relative depth data. As discussed above, the relative depth data can serve as placeholder depth data. Using the lidar data as captured depth data, estimated depth data associated with the object can be determined.

Figure 11:
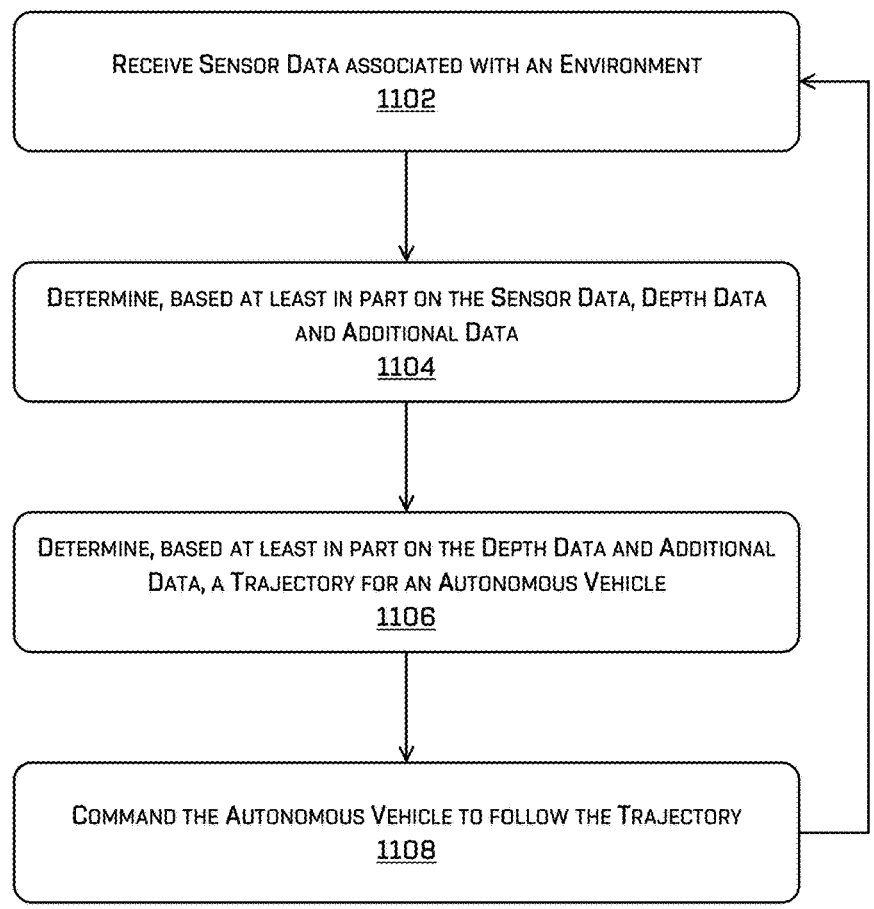
FIG. 11 is an example process of determining depth data, determining a trajectory, and commanding an autonomous vehicle to follow the trajectory.

FIG. 11 depicts an example process 1100 for commanding an autonomous vehicle to follow a trajectory. Additionally, some portions of process 1100 can be omitted, replaced, and/or reordered while still providing the functionality of commanding an autonomous vehicle to follow the trajectory.

At operation 1102, an autonomous vehicle can receive sensor data associated with an environment. The sensor data can include image data and, in some instances, include lidar data.

At operation 1104, the autonomous vehicle can determine, based at least in part on the sensor data, depth data and additional data. As discussed above, the autonomous vehicle can use a machine-learned model to generate the depth data and/or the additional data. The additional data can include location data, three-dimensional bounding box data, and relative depth data.

At operation 1106, the autonomous vehicle can determine, based at least in part on the depth data and additional data, a trajectory for the autonomous vehicle.

At operation 1108, the process 1100 can include commanding the autonomous vehicle to follow the trajectory. In some instances, the operation 1108 can include generating a route, trajectory, and/or control signals to one or more systems of the autonomous vehicle to navigate the autonomous vehicle within the environment.

Figure 12:
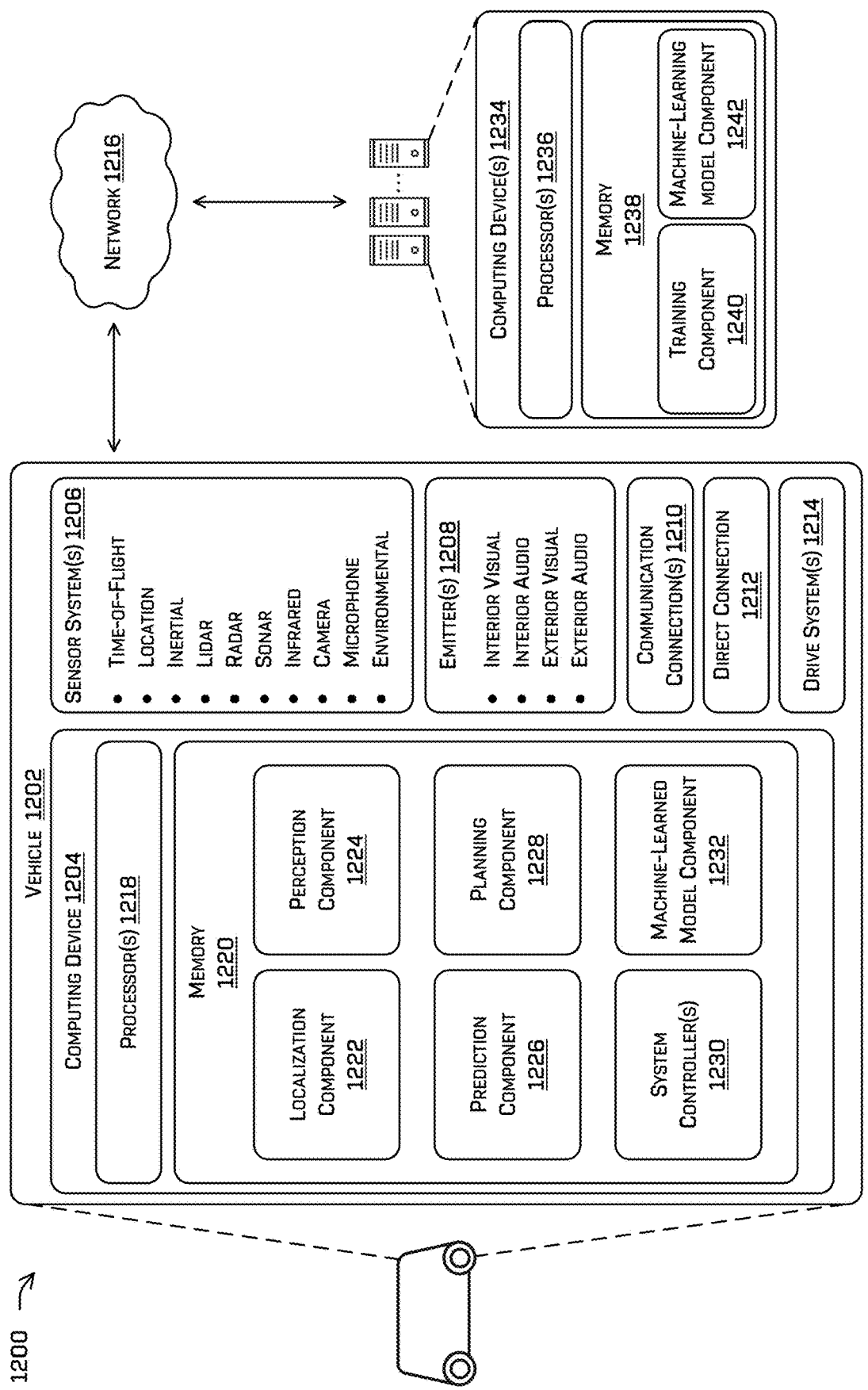
FIG. 12 is a block diagram of an example computer system for implementing the techniques described herein.

FIG. 12 depicts a block diagram of an example system 1200 for implementing the techniques discussed herein. In at least one example, the system 1200 can include a vehicle 1202, which can be similar to the vehicle 104 described above with reference to FIG. 1, the vehicle 202 described above with reference to FIG. 2, and/or the vehicle 604 described above with reference to FIG. 6. In the illustrated example system 1200, the vehicle 1202 is an autonomous vehicle; however, the vehicle 1202 can be any other type of vehicle.

The vehicle 1202 can include a computing device 1204, one or more sensor system(s) 1206, one or more emitter(s) 1208, one or more communication connection(s) 1210 (also referred to as communication devices and/or modems), at least one direct connection 1212 (e.g., for physically coupling with the vehicle 1202 to exchange data and/or to provide power), and one or more drive system(s) 1214. The one or more sensor system(s) 1206 can be configured to capture sensor data associated with an environment.

The one or more sensor system(s) 1206 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 1206 can include multiple instances of each of these or other types of sensors. For instance, the time-of-flight sensors can include individual time-of-flight sensors located at the corners, front, back, sides, and/or top of the vehicle 1202. As another example, the camera sensors can include multiple cameras disposed at various locations about the exterior and/or interior of the vehicle 1202. The one or more sensor system(s) 1206 can provide input to the computing device 1204.

The vehicle 1202 can also include one or more emitter(s) 1208 for emitting light and/or sound. The one or more emitter(s) 1208 in this example include interior audio and visual emitters to communicate with passengers of the vehicle 1202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 1208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 1202 can also include one or more communication connection(s) 1210 that enable communication between the vehicle 1202 and one or more other local or remote computing device(s) (e.g., a remote teleoperation computing device) or remote services. For instance, the one or more communication connection(s) 1210 can facilitate communication with other local computing device(s) on the vehicle 1202 and/or the one or more drive system(s) 1214. Also, the one or more communication connection(s) 1210 can allow the vehicle 1202 to communicate with other nearby computing device(s) (e.g., other nearby vehicles, traffic signals, etc.).

The one or more communications connection(s) 1210 can include physical and/or logical interfaces for connecting the computing device 1204 to another computing device or one or more external networks 1216 (e.g., the Internet). For example, the one or more communications connection(s) 1210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the one or more communication connection(s) 1210 may comprise the one or more modems as described in detail above.

In at least one example, the vehicle 1202 can include one or more drive system(s) 1214. In some examples, the vehicle 1202 can have a single drive system 1214. In at least one example, if the vehicle 1202 has multiple drive systems 1214, individual drive systems 1214 can be positioned on opposite ends of the vehicle 1202 (e.g., the front and the rear, etc.). In at least one example, the drive system(s) 1214 can include one or more sensor system(s) 1206 to detect conditions of the drive system(s) 1214 and/or the surroundings of the vehicle 1202. By way of example and not limitation, the sensor system(s) 1206 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 1214. In some cases, the sensor system(s) 1206 on the drive system(s) 1214 can overlap or supplement corresponding systems of the vehicle 1202 (e.g., sensor system(s) 1206).

The drive system(s) 1214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1214 can include a drive system controller which can receive and preprocess data from the sensor system(s) 1206 and to control operation of the various vehicle systems. In some examples, the drive system controller can include one or more processor(s) and memory communicatively coupled with the one or more processor(s). The memory can store one or more modules to perform various functionalities of the drive system(s) 1214. Furthermore, the drive system(s) 1214 also include one or more communication connection(s) that enable communication by the respective drive system with one or more other local or remote computing device(s).

The computing device 1204 can include one or more processor(s) 1218 and memory 1220 communicatively coupled with the one or more processor(s) 1218. In the illustrated example, the memory 1220 of the computing device 1204 stores a localization component 1222, a perception component 1224, a prediction component 1226, a planning component 1228, one or more system controller(s) 1230, and a machine-learned model component 1232. Though depicted as residing in the memory 1220 for illustrative purposes, it is contemplated that the localization component 1222, the perception component 1224, the prediction component 1226, the planning component 1228, the one or more system controller(s) 1230, and the machine-learned model component 1232 can additionally, or alternatively, be accessible to the computing device 1204 (e.g., stored in a different component of vehicle 1202 and/or be accessible to the vehicle 1202 (e.g., stored remotely).

In memory 1220 of the computing device 1204, the localization component 1222 can include functionality to receive data from the sensor system(s) 1206 to determine a position of the vehicle 1202. For example, the localization component 1222 can include and/or request/receive a three-dimensional map of an environment and can continuously determine a location of the autonomous vehicle within the map. In some instances, the localization component 1222 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 1222 can provide data to various components of the vehicle 1202 to determine an initial position of an autonomous vehicle for generating a trajectory, as discussed herein.

As discussed above, the localization component 1222 can use depth data generated by the machine-learned model component 1232 to perform the operations described above to determine the position of the vehicle 1202. The depth data can provide a local map for comparing against the three-dimensional map (e.g., mesh). In some instances, the localization component 1222 can provide functionality to determine an error associated with the local map, the three-dimensional map, and/or the one or more sensor system(s) 1206. For example, the localization component 1222 can determine a position error (e.g., drift error) associated with the vehicle 1202. Over time in operation, errors may accumulate, resulting in errors in positioning and/or trajectory data. In some instances, the localization component can determine the error based on, for example, the position error meeting or exceeding a threshold value. In some instances, the localization component 1222 can, based on the position error, determine a calibration adjustment associated with the one or more sensor system(s) 1206.

For purposes of illustration only, the localization component 1222 can determine a location of the vehicle based on GPS data from the one or more sensor system(s) 1206. However, a comparison of the local map can indicate that the vehicle is in a different location than the location indicated by the GPS data. Therefore, the localization component 1222 can indicate that an error exists with a GPS sensor and/or the local map.

In some instances, the localization component 1222 can determine an update associated with the three-dimensional map. For purposes of illustration only, the one or more sensor system(s) 1206 can provide location data to the localization component 1222. Additionally, the localization component 1222 can determine a location based on a comparison of the local map and the three-dimensional map. However, the comparison can indicate that one or more points of the local map do not correspond with the three-dimensional map. This can indicate that the three-dimensional map is out of date. The localization component 1222 can determine a difference between the local map and the three-dimensional map as a map updated and store the map update or provide the map update to, for example, a map data server via network 1216.

The perception component 1224 can include functionality to perform object detection, segmentation, and/or classification. In some examples, the perception component 1224 can provide processed sensor data that indicates a presence of an entity that is proximate to the vehicle 1202 and/or a classification of the entity as an entity type (e.g., car, pedestrian, cyclist, building, tree, road surface, curb, sidewalk, unknown, etc.). In additional and/or alternative examples, the perception component 1224 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 1224 can use perception algorithms to determine a perception-based bounding box associated with an object in the environment based on sensor data. For example, the perception component 1224 can receive image data and classify the image data to determine that an object is represented in the image data. Then, using detection algorithms, the perception component 1224 can generate a two-dimensional bounding box and/or a perception-based three-dimensional bounding box associated with the object. The perception component 1224 can provide the image data and the two-dimensional bounding box to the machine-learned model component 1232 to generate a three-dimensional bounding box associated with the object. As discussed above, the three-dimensional bounding box can provide additional information such as a location, orientation, pose, and/or size (e.g., length, width, height, etc.) associated with the object.

The perception component 1224 can include functionality to store perception data generated by the perception component 1224. In some instances, the perception component 1224 can determine a track corresponding to an object that has been classified as an object type. For purposes of illustration only, the perception component 1224, using sensor system(s) 1206 can capture one or more images of an environment. The sensor system(s) 1206 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 1206, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 1226 can generate one or more probability maps representing prediction probabilities of possible locations of one or more objects in an environment. For example, the prediction component 1226 can generate one or more probability maps for vehicles, pedestrians, animals, and the like within a threshold distance from the vehicle 1202. In some instances, the prediction component 1226 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 1228 can determine a path for the vehicle 1202 to follow to traverse through an environment. For example, the planning component 1228 can determine various routes and paths and various levels of detail. In some instances, the planning component 1228 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 1228 can generate an instruction for guiding the autonomous vehicle along at least a portion of the route from the first location to the second location. In at least one example, the planning component 1228 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 1228 can alternatively, or additionally, use data from the perception component 1224 and/or the prediction component 1226 to determine a path for the vehicle 1202 to follow to traverse through an environment. For example, the planning component 1228 can receive data from the perception component 1224 and/or the prediction component 1226 regarding objects associated with an environment. Using this data, the planning component 1228 can determine a route to travel from a first location (e.g., a current location) to a second location (e.g., a target location) to avoid objects in an environment. In at least some examples, such a planning component 1228 may determine there is no such collision free path and, in turn, provide a path which brings vehicle 1202 to a safe stop avoiding all collisions and/or otherwise mitigating damage.

In at least one example, the computing device 1204 can include one or more system controller(s) 1230, which can be configured to control steering, propulsion, braking, safety, emitters, communication, and other systems of the vehicle 1202. These system controller(s) 1230 can communicate with and/or control corresponding systems of the drive system(s) 1214 and/or other components of the vehicle 1202, which may be configured to operate in accordance with a path provided from the planning component 1228.

The machine-learned model component 1232 can receive sensor data, such as image data, from the one or more sensor system(s) 1206 and generate depth data associated with the image data. As described above, the machine-learned model component 1232 can generate the depth data and provide the depth data to the localization component 1222 to determine a location of the vehicle 1202. In some instances, the machine-learned model component 1232 can provide the depth data to the perception component 1224 to generate three-dimensional bounding boxes associated with an object of an environment and/or determine relative depth data associated with the image data.

The vehicle 1202 can connect to computing device(s) 1234 via network 1216 and can include one or more processor(s) 1236 and memory 1238 communicatively coupled with the one or more processor(s) 1236. In at least one instance, the one or more processor(s) 1236 can be similar to the processor(s) 1218 and the memory 1238 can be similar to the memory 1220. In the illustrated example, the memory 1238 of the computing device(s) 1234 stores a training component 1240 and a machine-learning model component 1242. In at least one instance, the machine-learning model component 1242, after training, can be similar to the machine-learned model component 1232. Though depicted as residing in the memory 1238 for illustrative purposes, it is contemplated that the training component 1240 and the machine-learning model component 1242 can additionally, or alternatively, be accessible to the computing device(s) 1234 (e.g., stored in a different component of computing device(s) 1234 and/or be accessible to the computing device(s) 1234 (e.g., stored remotely).

In the memory 1238 of the computing device(s) 1234, training component 1240 can train the machine-learning model component 1242 to generate depth data based on image data. The training component 1240 can determining training data as inputs to the machine-learning model component 1242. For example, the training data can include sensor data such as training image data captured by a vehicle. In some instances, the image data can be modified image data and/or synthetic image data. Additionally, the training data can include sensor data such as lidar data and/or bounding box data (e.g., two-dimensional bounding box data and/or three-dimensional bounding box data) as ground truth data.

The machine-learning model component 1242 can use the training data provided by the training component 1240 to determine depth data associated with the training image data. In some instances, the machine-learning model component 1242 can be trained to generate three-dimensional bounding boxes as discussed in reference to FIGS. 5-7 as well as relative depth data as discussed in reference to FIGS. 8-10. Once the machine-learning model component 1242 is trained, the machine-learning model component 1242 can be deployed in the vehicle 1202 as the machine-learned model component 1232.

The processor(s) 1218 of the computing device 1204 and the processor(s) 1236 of the computing device(s) 1234 can be any suitable processor capable of executing instructions to process data and perform operations as described herein. By way of example and not limitation, the processor(s) 1218 and 1236 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1220 computing device 1204 and the memory 1238 of the computing device(s) 1234 are examples of non-transitory computer-readable media. The memory 1220 and 1238 can store an operating system and one or more software applications, instructions, programs, and/or data to implement the methods described herein and the functions attributed to the various systems. In various implementations, the memory 1220 and 1238 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Figure 13A:
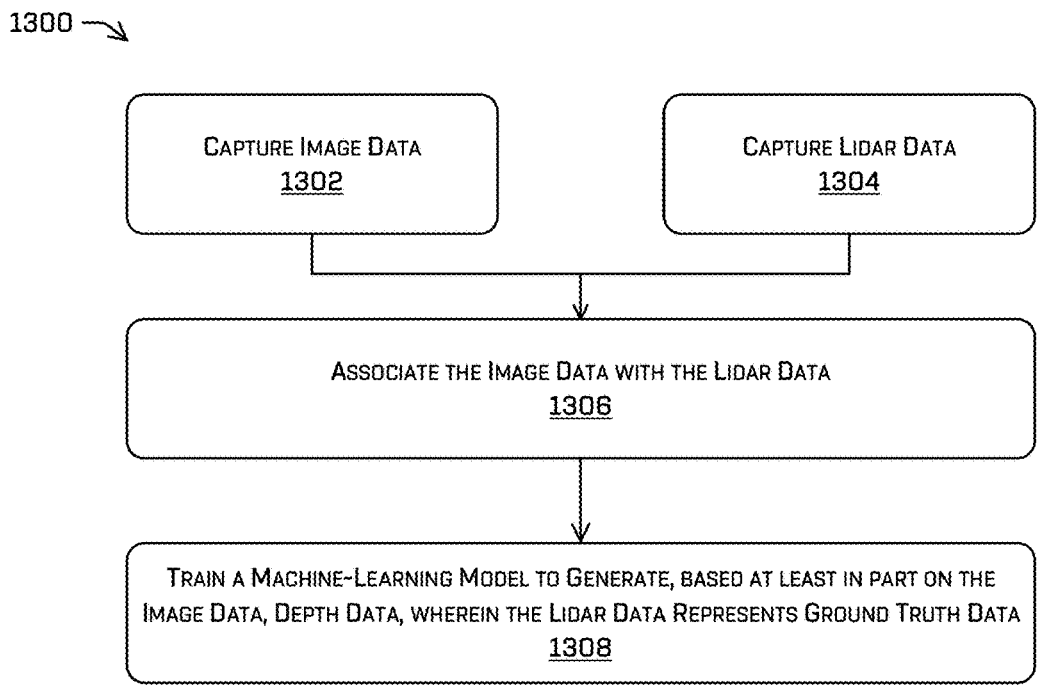
FIG. 13A is an example process for training a machine-learning model to generate image-based depth data.

FIG. 13A illustrates an example process 1300 for training a machine-learning model to generate image-based depth data. Some portions of process 1300 can be omitted, replaced, and/or reordered while still providing the functionality of training a machine-learning model to generate image-based depth data. At operation 1302, the process 1300 can capture image data and capture lidar data at operation 1304. As described above, one or more sensor systems of a vehicle can capture the image data and the lidar data. At operation 1306, the image data is associated with the lidar data. That is, lidar points that correspond to a particular point in space can be identified as corresponding to a pixel in image data. For purposes of illustration only, the lidar data can be associated with a particular position in space (an x-coordinate, a y-coordinate, and a z-coordinate). The image data can be associated with the lidar data by using the x-coordinate and the y-coordinate to identify a pixel of the image data. At operation 1308, the image data and the lidar data are input into a machine-learning model. The machine-learning model can be trained to generate depth data based at least in part on the image data, wherein the lidar data represents ground truth data. For example, the training data can be input to a machine-learning model where a known result (e.g., a ground truth, such as a known depth value) can be used to adjust weights and/or parameters of the machine-learning model to minimize an error. In some instances, the ground truth data can be captured depth data (e.g., lidar data). As discussed above, the machine-learning model can use loss functions (e.g., L1, L2, softmax, etc.) to minimize the error. In some examples, the machine-learning model can be similar to the machine-learning model component 1242 described above with reference to FIG. 12.

Figure 13B:
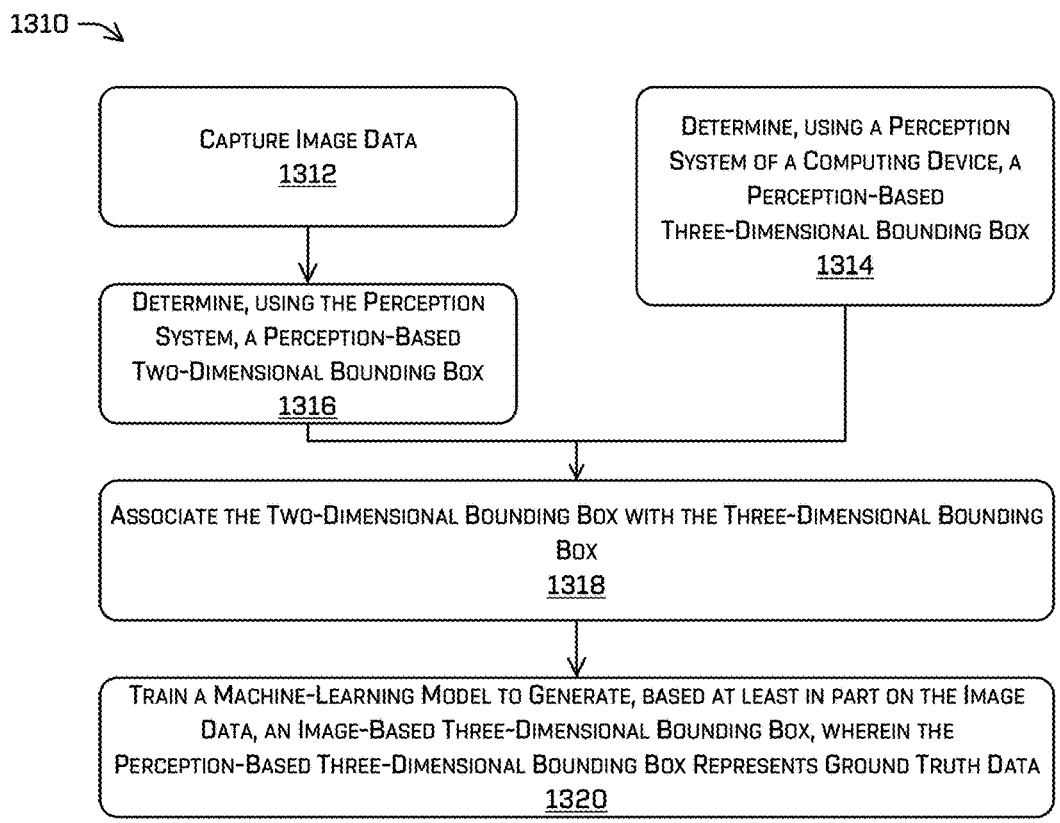
FIG. 13B is an example process for training a machine-learning model to generate image-based three-dimensional bounding boxes.

FIG. 13B illustrates an example process 1310 for training a machine-learning model to generate an image-based three-dimensional bounding box. Some portions of process 1310 can be omitted, replaced, and/or reordered while still providing the functionality of training a machine-learning model to generate an image-based three-dimensional bounding box. At operation 1312, image data can be captured using, for example, a sensor of a vehicle. At operation 1314, a perception-based three-dimensional bounding box can be determined using a perception system of a computing device. In some examples, the perception system can be similar to the perception component 1224 and the computing device can be similar to the computing device 1204 described above with reference to FIG. 12. At operation 1316, the perception system of the computing device can determine a two-dimensional bounding box. In some instances, the two-dimensional bounding box can be based on the image data captured at operation 1312. At operation 1318, the two-dimensional bounding box can be associated with the perception-based three-dimensional bounding box. In some instances, the perception system can use segmentation (e.g., semantic segmentation, instance segmentation, etc.), tracking, or other techniques to associate the two-dimensional bounding box with the three-dimensional bounding box. At operation 1320, the machine-learning model can be trained to generate an image-based three-dimensional bounding box based at least in part the image data, wherein the perception-based three-dimensional bounding box represents ground truth data. For example, the training data can be input to a machine-learning model where a known result (e.g., a ground truth, such as a perception-based three-dimensional bounding box) can be used to adjust weights and/or parameters of the machine-learning model to minimize an error. As discussed above, the machine-learning model can use loss functions (e.g., L1, L2, softmax, etc.) to minimize the error. In some examples, the machine-learning model, after training, can be similar to the machine-learned model component 1232 described above with reference to FIG. 12.

In some instances, aspects of some or all of the components discussed herein can include any models, algorithms, and/or machine-learning algorithms. For example, in some instances, the components in the memory 1220 and 1238 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide a robust implementation of determining depth data of an environment based on image data to allow the safe operation of an autonomous vehicle.

EXAMPLE CLAUSES

A: A system comprising: one or more processors; and one or more computer-readable media storing computer-executable instructions that, when executed, cause the one or more processors to perform operations comprising: accessing lidar-based map data of an environment, the lidar-based map data comprising a three-dimensional mesh associated with the environment; capturing, by a sensor of an autonomous vehicle, image data associated with the environment; inputting the image data to a machine-learned model; receiving, from the machine-learned model, depth data associated with the image data, wherein the depth data comprising a point cloud associated with the environment; and determining a location of the autonomous vehicle in the environment by comparing a first portion of the depth data to a second portion of the lidar-based map data.

B: The system of paragraph A, the operations further comprising: controlling, based at least in part on the location, the autonomous vehicle.

C: The system of paragraph A, wherein the depth data is first depth data, and wherein the operations further comprise: receiving second depth data captured by a lidar sensor.

D: The system of paragraph A, wherein the depth data is first depth data, the operations further comprising: determining, based at least in part on the image data, a third portion of the image data representing an object in the environment; determining a classification associated with the object; determining, based at least in part on the classification, a fourth portion of the first depth data; and determining, based at least in part on discarding the fourth portion of the depth data, second depth data corresponding to the third portion of the image data, wherein determining the location of the autonomous vehicle comprises comparing the second depth data to the second portion of the lidar-based map data.

E: The system of paragraph D, wherein determining the classification associated with the object comprises: determining an object type associated with the object, the object type comprising at least one of a vehicle, a cyclist, a pedestrian, or an animal.

F: A method comprising: accessing map data of an environment; receiving image data from an image sensor on a vehicle; inputting at least a first portion of the image data to a machine-learned model trained to determine depth data based on the first portion of the image data; receiving, from the machine-learned model, the depth data comprising a point cloud associated with the environment; and determining, based at least in part on comparing a second portion of the depth data to a third portion of the map data, a location of the vehicle in the environment.

G: The method of paragraph F, wherein determining the location of the vehicle is based at least in part on a localization algorithm comprising at least one of: an iterative closest point algorithm, a robust point matching algorithm, a kernel correlation algorithm, a coherent point drift algorithm, or a sorting correspondence space algorithm.

H: The method of paragraph F, wherein the vehicle is an autonomous vehicle, the method further comprising: controlling, based at least in part on the location, the autonomous vehicle.

I: The method of paragraph F, wherein the map data comprises at least one of: mesh map data, or voxel-based map data.

J: The method of paragraph F, wherein the depth data further comprises: surface normal data associated with a static object of the environment.

K: The method of paragraph F, wherein the machine-learned model is trained based at least in part on inputting captured depth data captured by a depth sensor, wherein the captured depth data corresponds to ground truth data.

L: The method of paragraph F, wherein the depth data is based at least in part on a discrete depth bin and a continuous offset associated with the discrete depth bin.

M: The method of paragraph F, wherein the location is a first location, the method further comprising: receiving, from a lidar sensor on the vehicle, lidar data; determining, based at least in part on at least a portion of the lidar data to the map data, a second location of the vehicle in the environment; determining a difference between the first location and the second location; and determining that the difference meets or exceeds a threshold value.

N: The method of paragraph M, further comprising: determining, based at least in part on the difference meeting or exceeding the threshold value, a calibration adjustment associated with the image sensor on the vehicle.

O: A non-transitory computer-readable medium storing instructions executable by a processor, wherein the instructions, when executed, cause the processor to perform operations comprising: receiving lidar-based map data of an environment; receiving, from a sensor on a vehicle, image data; determining, based at least in part on the image data, depth data associated with the image data; and determining, based at least in part on the depth data and the lidar-based map data, a location of the vehicle in the environment.

P: The non-transitory computer-readable medium of paragraph O, wherein the depth data comprises: surface normal data that indicates a vector associated with a surface of a static object of the environment.

Q: The non-transitory computer-readable medium of paragraph O, the operations further comprising: inputting at least a portion of the image data to a machine-learned model; and receiving, from the machine-learned model, the depth data.

R: The non-transitory computer-readable medium of paragraph O, wherein the depth data is based at least in part on a discrete depth bin and a continuous offset associated with the discrete depth bin, wherein the discrete depth bin is based at least in part on a non-linear scale.

S: The non-transitory computer-readable medium of paragraph O, wherein the sensor is a first sensor and the location is a first location, the operations further comprising: receiving, from a second sensor on the vehicle, lidar data; determining, based at least in part on at least a portion of the lidar data and the lidar-based map data, a second location of the vehicle in the environment; determining a difference between the first location and the second location; and determining that the difference meets or exceeds a threshold value.

T: The non-transitory computer-readable medium of paragraph S, the operations further comprising: determining, based at least in part on the difference, a calibration adjustment associated with at least one of the first sensor or the second sensor.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   determining reference data of an environment;
   determining image data from an image sensor associated with a vehicle;
   inputting a portion of the image data to a machine-learned model;
   receiving, from the machine-learned model and based at least in part on the portion of the image data, depth data associated with the environment; and
   determining, based at least in part on comparing a portion of the depth data to a portion of the reference data, a location in the environment.

2. The method of claim 1, wherein the depth data comprises at least one of:
   a point cloud; or
   surface normal data associated with a static object of the environment.

3. The method of claim 1, wherein the machine-learned model is trained based at least in part on inputting captured depth data captured by a depth sensor, and wherein the captured depth data corresponds to ground truth data.

4. The method of claim 1, wherein the reference data comprises at least one of:
   map data;
   mesh map data; voxel-based map data; or
   object data.

5. The method of claim 1, wherein determining the location is based at least in part on a localization algorithm comprising at least one of:
   an iterative closest point algorithm;
   a robust point matching algorithm;
   a kernel correlation algorithm;
   a coherent point drift algorithm; or
   a sorting correspondence space algorithm.

6. The method of claim 1, wherein the vehicle is an autonomous vehicle, the method further comprising:
   controlling, based at least in part on the location, the autonomous vehicle.

7. The method of claim 1, wherein the depth data is based at least in part on a discrete depth bin and a continuous offset associated with the discrete depth bin.

8. The method of claim 1, wherein the location is a first location, the method further comprising:
   receiving, from a lidar sensor associated with the vehicle, lidar data;

determining, based at least in part on at least a portion of the lidar data relative to the reference data, a second location of the vehicle in the environment;

determining a difference between the first location and the second location; and determining that the difference meets or exceeds a threshold value.

9. The method of claim 8, further comprising:

determining, based at least in part on the difference meeting or exceeding the threshold value, a calibration adjustment associated with the image sensor.

10. One or more non-transitory computer-readable media storing instructions executable by one or more processors, wherein the instructions, when executed, cause the one or more processors to perform operations comprising:

determining reference data of an environment;

determining image data from an image sensor associated with a vehicle;

inputting a portion of the image data to a machine-learned model;

receiving, from the machine-learned model and based at least in part on the portion of the image data, depth data associated with the environment; and determining, based at least in part on comparing a portion of the depth data to a portion of the reference data, a location in the environment.

11. The one or more non-transitory computer-readable media of claim 10, wherein the depth data comprises at least one of:

a point cloud;

relative depth data; or surface normal data that indicates a vector associated with a surface of a static object of the environment.

12. The one or more non-transitory computer-readable media of claim 10, wherein:

the depth data is based at least in part on a discrete depth bin and a continuous offset associated with the discrete depth bin; and the discrete depth bin is based at least in part on a non-linear scale.

13. The one or more non-transitory computer-readable media of claim 10, wherein the image sensor is a first sensor and the location is a first location, the operations further comprising:

receiving, from a second sensor associated with the vehicle, lidar data;

determining, based at least in part on at least a portion of the lidar data and the reference data, a second location in the environment;

determining a difference between the first location and the second location; and determining that the difference meets or exceeds a threshold value.

14. The one or more non-transitory computer-readable media of claim 13, the operations further comprising:

determining, based at least in part on the difference, a calibration adjustment associated with at least one of the first sensor or the second sensor.

15. A system comprising:

one or more processors; and one or more non-transitory computer-readable media storing computer-executable instructions that, when executed, cause the one or more processors to perform operations comprising:

determining reference data of an environment;

determining image data from an image sensor associated with a vehicle;

inputting a portion of the image data to a machine-learned model;

receiving, from the machine-learned model and based at least in part on the portion of the image data, depth data associated with the environment; and determining, based at least in part on comparing a portion of the depth data to a portion of the reference data, a location in the environment.

16. The system of claim 15, wherein the depth data comprises at least one of:

a point cloud; or surface normal data that indicates a vector associated with a surface of a static object of the environment.

17. The system of claim 15, wherein the reference data comprises at least one of:

map data;

mesh map data;

voxel-based map data; or object data.

18. The system of claim 15, the operations further comprising:

determining that the image data represents an object in the environment;

determining a classification associated with the object; and determining, based at least in part on the classification, a second portion of the depth data corresponding to the object.

19. The system of claim 15, the operations further comprising:

receiving, from the machine-learned model and based at least in part on the portion of the image data, a three-dimensional bounding box associated with an object in the environment.

20. The system of claim 15, wherein the depth data comprises relative depth data, the operations further comprising:

determining an object represented in the portion of the image data;

determining a reference point associated with the object;

receiving, from the machine-learned model, the relative depth data associated with the object, the relative depth data being relative to a depth associated with the reference point; and determining, based at least in part on the reference point and the relative depth data, estimated depth data.

* * * * *